(12) United States Patent
Crabtree et al.

(10) Patent No.: US 7,148,801 B2
(45) Date of Patent: Dec. 12, 2006

(54) ARTICLE LOCATOR SYSTEM

(76) Inventors: Timothy L. Crabtree, 5519 Paseo Gilberto, Yorba Linda, CA (US) 92886; Reza P. Rassool, 25820 Barnet La., Stevenson Ranch, CA (US) 91381; Michael F. Wells, 1733 Gentle Breeze La., Encinitas, CA (US) 92024; Gregory J. DelMain, 9001 Sawgrass Glen N., Maple Grove, MN (US) 55311; Peter White, 14455 Maplewood, Poway, CA (US) 92064; Paul McArthur, 1282 W. Indigo Dr., Chandler, AZ (US) 58248

( * ) Notice: Subject to any disclaimer, the term of this patent is extended or adjusted under 35 U.S.C. 154(b) by 97 days.

(21) Appl. No.: 10/909,909

(22) Filed: Aug. 2, 2004

(65) Prior Publication Data

US 2005/0007251 A1    Jan. 13, 2005

Related U.S. Application Data

(63) Continuation of application No. 10/097,544, filed on Mar. 12, 2002, now Pat. No. 6,788,199.

(60) Provisional application No. 60/275,362, filed on Mar. 12, 2001.

(51) Int. Cl.
*G08B 1/08* (2006.01)

(52) U.S. Cl. .................... 340/539.13; 340/539.32; 340/568.1; 340/573.4; 340/686.6

(58) Field of Classification Search ............ 340/539.1, 340/539.11, 539.13, 539.15, 539.16, 571, 340/572.1, 573.1, 573.2, 573.3, 573.4, 825.49; 342/44, 357.07
See application file for complete search history.

(56) References Cited

U.S. PATENT DOCUMENTS

| 3,806,936 | A | | 4/1974 | Koster ..................... 342/419 |
| 3,921,172 | A | | 11/1975 | Litchford ................. 342/147 |
| 4,083,003 | A | | 4/1978 | Haemmig ................. 340/525 |
| 4,217,588 | A | * | 8/1980 | Freeny, Jr. ................ 342/458 |
| 4,476,469 | A | | 10/1984 | Lander ................... 340/539.1 |
| 4,495,496 | A | | 1/1985 | Miller, III ................ 340/10.2 |

(Continued)

FOREIGN PATENT DOCUMENTS

DE    197 26 456 A1    1/1999

OTHER PUBLICATIONS

Brochure of ChildFinder from Gavrity Electronics, Inc., Jan. 1996—Located at 415 Cleveland Avenue, Highland Park, NJ 08904.

(Continued)

*Primary Examiner*—Van T. Trieu
(74) *Attorney, Agent, or Firm*—Knobbe, Martens, Olson and Bear, LLP

(57) ABSTRACT

A system and method for locating objects such as people, pets, and personal articles is described. A transceiver is attached to the person, animal, or item to be tracked and a handheld locator device is employed to transmit a locator signal containing an address code to the transceiver. Upon receipt of a signal, the transceiver compares the address code contained in the locator signal with an address code stored in the transceiver. If the two codes are same, the transceiver sends a return signal back to the locator device. The locator device uses this return signal to determine the distance and/or direction of the transceiver from the user's location. The system allows a user to select from a multiple number of items to locate and allows multiple users to search for different articles within the same general area without interference.

12 Claims, 14 Drawing Sheets

U.S. PATENT DOCUMENTS

| | | | |
|---|---|---|---|
| 4,593,273 A | 6/1986 | Narcisse | 340/573.4 |
| 4,598,272 A | 7/1986 | Cox | 340/539.2 |
| 4,694,284 A | 9/1987 | Leveille et al. | 340/574 |
| 4,777,478 A | 10/1988 | Hirsch et al. | 340/573.3 |
| 4,785,291 A | 11/1988 | Hawthorne | 340/573.4 |
| 4,814,751 A | 3/1989 | Hawkins et al. | 340/573.1 |
| 4,818,998 A | 4/1989 | Apsell et al. | 342/444 |
| 4,899,135 A | 2/1990 | Ghahariiran | 340/573.4 |
| 4,908,629 A | 3/1990 | Apsell et al. | 342/457 |
| 4,918,425 A | 4/1990 | Greenberg et al. | 340/539.3 |
| 4,961,575 A | 10/1990 | Perry | 273/460 |
| 5,016,227 A | 5/1991 | Turner, Jr. | 367/3 |
| 5,021,794 A | 6/1991 | Lawrence | 340/539.1 |
| 5,067,441 A | 11/1991 | Weinstein | 340/573.3 |
| 5,086,290 A | 2/1992 | Murray et al. | 340/539.13 |
| 5,086,394 A | 2/1992 | Shapira | 340/407.2 |
| 5,115,223 A | 5/1992 | Moody | 340/573.1 |
| 5,119,072 A | 6/1992 | Hemingway | 340/573.1 |
| D329,620 S | 9/1992 | Salazar | D10/106 |
| 5,144,294 A * | 9/1992 | Alonzi et al. | 340/825.49 |
| 5,193,216 A | 3/1993 | Davis | 455/67.7 |
| 5,196,825 A | 3/1993 | Young | 340/539.1 |
| 5,223,815 A | 6/1993 | Rosenthal et al. | 340/539.2 |
| 5,245,314 A | 9/1993 | Kah, Jr. | 340/539.13 |
| 5,289,163 A | 2/1994 | Perez et al. | 340/539.32 |
| 5,294,915 A | 3/1994 | Owen | 340/539.32 |
| 5,298,883 A | 3/1994 | Pilney et al. | 340/573.2 |
| 5,307,053 A | 4/1994 | Wills et al. | 340/573.1 |
| 5,311,185 A * | 5/1994 | Hochstein et al. | 342/44 |
| 5,337,041 A | 8/1994 | Friedman | 340/573.4 |
| 5,357,254 A | 10/1994 | Kah, Jr. | 342/42 |
| 5,389,915 A | 2/1995 | Chen | 340/573.4 |
| 5,461,365 A | 10/1995 | Schlager et al. | 340/573.4 |
| 5,525,967 A | 6/1996 | Azizi et al. | 340/572.1 |
| 5,526,357 A * | 6/1996 | Jandrell | 370/346 |
| 5,557,259 A | 9/1996 | Musa | 340/573.4 |
| 5,589,821 A | 12/1996 | Sallen et al. | 340/573.4 |
| 5,635,907 A | 6/1997 | Bernard et al. | 340/573.4 |
| 5,640,146 A | 6/1997 | Campana, Jr. | 340/573.4 |
| 5,650,769 A | 7/1997 | Campana, Jr. | 340/573.4 |
| 5,650,770 A | 7/1997 | Schalger et al. | 340/573.1 |
| 5,652,569 A | 7/1997 | Gerstenberger et al. | 340/573.4 |
| 5,661,460 A | 8/1997 | Sallen et al. | 340/573.4 |
| D383,687 S | 9/1997 | Conrado et al. | D10/104 |
| D385,559 S | 10/1997 | Conrado et al. | D14/159 |
| 5,686,887 A | 11/1997 | Chen et al. | 340/539.19 |
| 5,686,902 A | 11/1997 | Reis et al. | 340/10.2 |
| 5,689,240 A | 11/1997 | Traxler | 340/573.4 |
| D390,566 S | 2/1998 | Martek et al. | D14/230 |
| D390,568 S | 2/1998 | Martek et al. | D14/233 |
| D390,569 S | 2/1998 | Martek et al. | D14/233 |
| 5,714,932 A | 2/1998 | Castellon et al. | 340/539.11 |
| 5,742,233 A | 4/1998 | Hoffman et al. | 340/573.1 |
| 5,745,037 A | 4/1998 | Guthrie et al. | 340/573.4 |
| D394,018 S | 5/1998 | Garcia | D10/104 |
| 5,771,002 A | 6/1998 | Creek et al. | 340/539.21 |
| 5,838,227 A | 11/1998 | Murray | 340/539.21 |
| 5,841,352 A | 11/1998 | Prakash | 340/573.4 |
| 5,874,896 A | 2/1999 | Lowe et al. | 340/572.1 |
| 5,892,447 A | 4/1999 | Wilkinson | 340/573.4 |
| 5,900,817 A | 5/1999 | Olmassakian | 340/573.1 |
| 5,900,818 A | 5/1999 | Lemnell | 340/573.3 |
| 5,917,423 A | 6/1999 | Duvall | 340/825.37 |
| 5,920,261 A | 7/1999 | Hughes et al. | 340/568.8 |
| 5,939,981 A | 8/1999 | Renney | 340/539.32 |
| 5,952,921 A | 9/1999 | Donnelly | 340/568.6 |
| 5,969,595 A | 10/1999 | Schipper et al. | 340/426.19 |
| 5,977,913 A | 11/1999 | Christ | 342/465 |
| 5,995,007 A | 11/1999 | Borja et al. | 340/573.4 |
| D419,899 S | 2/2000 | Levar et al. | D10/104 |
| 6,046,682 A | 4/2000 | Zimmerman et al. | 340/825.49 |
| D424,463 S | 5/2000 | Babers, Jr. | D10/104 |
| 6,058,374 A | 5/2000 | Guthrie et al. | 705/28 |
| 6,075,442 A | 6/2000 | Welch | 340/573.1 |
| 6,078,260 A | 6/2000 | Desch | 340/573.1 |
| 6,084,517 A | 7/2000 | Rabanne et al. | 340/573.4 |
| 6,097,315 A | 8/2000 | Minter | 340/961 |
| 6,111,508 A | 8/2000 | Ensor et al. | 340/573.2 |
| 6,114,957 A | 9/2000 | Westrick et al. | 340/568.1 |
| 6,118,376 A | 9/2000 | Regester | 340/568.6 |
| 6,118,380 A | 9/2000 | Gannon | 340/573.4 |
| 6,127,917 A | 10/2000 | Tuttle | 340/10.1 |
| 6,127,928 A | 10/2000 | Issacman et al. | 340/572.1 |
| 6,127,931 A | 10/2000 | Mohr | 340/573.4 |
| 6,130,616 A | 10/2000 | Sizemore | 340/574 |
| 6,130,620 A | 10/2000 | Pinnow et al. | 340/5.86 |
| 6,144,859 A | 11/2000 | LaDue | 455/511 |
| 6,147,602 A | 11/2000 | Bender | 340/568.1 |
| 6,148,195 A | 11/2000 | Schuchman | 455/424 |
| 6,150,921 A | 11/2000 | Werb et al. | 340/10.1 |
| 6,150,928 A | 11/2000 | Murray | 340/426.14 |
| 6,166,643 A | 12/2000 | Janning et al. | 340/573.3 |
| 6,166,652 A | 12/2000 | Benvenuti | 340/825.49 |
| 6,169,484 B1 | 1/2001 | Schuchman | 392/307 |
| 6,304,186 B1 | 10/2001 | Rabanne et al. | 340/573.4 |
| 6,348,856 B1 | 2/2002 | Jones et al. | 340/10.1 |
| 6,362,737 B1 | 3/2002 | Rodgers et al. | 340/572.1 |
| 6,388,612 B1 * | 5/2002 | Neher | 342/357.07 |
| 6,502,060 B1 | 12/2002 | Christian | 702/178 |

OTHER PUBLICATIONS

Internet—FoolProof Personal Security System from web-site www.safetyandsecuritycenter.com—printed on Jan. 10, 2003.
Internet—Pet Traxx System from web-site www.trackerradio.com/pets.html—printed on Jan. 10, 2003
Internet—PetTrax—Pet Tracking System from web-site www.pettrax.net—printed on Jan. 10, 2003.
Internet—Smart Find Remote Control Key Locator from web-site www.brookstone.com—printed on Jan. 10, 2003.
Internet—Wireless RF Electronic Locator from web-site www.sharperimage.com—printed on Jan. 10, 2003.

* cited by examiner

ARTICLE LOCATOR SYSTEM

REFERENCE TO RELATED APPLICATIONS

This application is a continuation of U.S. application Ser. No. 10/097,544 filed Mar. 12, 2002, now U.S. Pat. No. 6,788,199; which claims priority to U.S. Provisional Application No. 60/275,362 filed Mar. 12, 2001, titled "Article Locator System," which is hereby incorporated by reference in its entirety.

BACKGROUND

1. Field of the Invention

The present invention relates generally to a device for locating lost articles, and more particularly, to a portable locator device that communicates with a transceiver through radio frequency signals to determine the relative distance and/or direction of the transceiver from the locator unit.

2. Description of the Related Art

Many devices have been proposed for the location of various types of objects. Most of these devices are limited to tracking a certain type of object, such as a child or a set of keys, or are confined to only occasional uses. Many of these devices are also limited in their range of applications due to such limiting factors as operating range, battery life, or the inability to selectively locate large numbers of different articles.

For example, the inventions described by U.S. Pat. No. 5,289,163 issued Feb. 22, 1994 to Perez, U.S. Pat. No. 4,785,291 issued Nov. 15, 1988 to Hawthorne, U.S. Pat. No. 5,900,817 issued May 4, 1999 to Olmassakian, U.S. Pat. No. 5,652,569 issued Jul. 29, 1997 to Gerstenberger et al., U.S. Pat. No. 6,127,931 issued Oct. 3, 2000 to Mohr, or U.S. Pat. No. 4,785,291 issued Nov. 15, 1988 to Hawthorne, generally relate to a form of an electronic leash for child monitoring.

These devices require the caregiver to activate the caregiver's monitoring device and child's transceiver device, and attach the transceiver to the child so that the child may be located if the parent and child become separated. While such devices may be useful in some circumstances, such as a shopping trip or a visit to the park, it is well known that children may wander away from their caregivers at any time without warning. If the child's transceiver device has not been activated before the child wanders away, the transceiver cannot be located by the caregiver's device.

Additionally, these systems rely on relatively constant communications between the child's transceiver device and the monitoring device. The need for constant communications between the transceiver and monitoring device disadvantageously requires the consumption of a large amount of power from the transceiver's battery. As a result, the transceiver may not have usable battery power at critical times in which the parent desires to locate the child.

Another class of locator devices is described, for example, in U.S. Pat. No. 5,939,981 issued Aug. 17, 1999 to Renney, U.S. Pat. No. 5,294,915 issued Mar. 15, 1994 to Owen or U.S. Pat. No. 6,166,652 issued Dec. 26, 2000 to Benvenuti. In general, these locator devices include a radio transmitter that is used to activate a radio receiver attached to an article, such as a television remote control or set of keys. When the receiver is activated, it emits an audible signal that alerts the user to location of the article to which the receiver is attached. Unfortunately, these systems are only useful over a relatively small area due to the limited range of the audible signal.

Accordingly, there is still an unfulfilled need for an article locator system that is power efficient, able to selectively locate multiple articles, and able to accurately locate articles beyond the immediate area of the locator device.

SUMMARY

The present invention solves these and other problems by providing an article locator system that includes a locator unit and one or more transceiver units. The transceiver, also referred to as a tag, is battery powered and relatively small in size so that it can be easily and non-obtrusively attached to an object that the user may need to locate at some time in the future. In one embodiment, a unique digital address code is stored in each transceiver.

The locator unit is capable of storing one or more digital address codes corresponding to the address codes stored in the receiver units. A user can search for a particular object by selecting the digital address code that corresponds to the code stored in the locator unit that is attached to the object the user desires to locate. The selected digital address code is then transmitted by wireless means from the locator unit to transceiver devices within range of the locator unit.

In one embodiment, in order to conserve power, the transceiver does not always remain activated. Instead, the transceiver periodically activates its receiver in order to determine if a signal is being sent from a locator device. When an address code is transmitted by the locator unit, all of the transceivers within range of the transmission will, at their next receiver activation cycle, detect the wireless transmission from the handheld locator. Each transceiver decodes the digital address signal and compares it to the unique address stored within the transceiver. If the address code transmitted by the locator device matches the address code stored in the transceiver, the transceiver activates its wireless transmitter and transmits a short-duration response signal. The locator device includes a wireless receiver that detects the wireless signal response from the selected transceiver. From this response signal, the distance and/or relative direction of the selected transceiver from the locator can be determined. This information is then displayed to the user.

The present invention is particularly advantageous, because in one embodiment, it provides the user with a variety of methods by which to locate an object to which a transceiver has been attached. This allows the user to best select the means that is most suited to the type of search the user is conducting. For instance, in various embodiments, the user may chose to locate a transceiver by measuring its bearing from the locator unit, its distance from the locator unit, or both its bearing and distance from the locator unit. Furthermore, in one embodiment, the user may chose to locate a transceiver by directing the transceiver to activate an indicator, such as an audible-tone or light, to alert the user as to the location of the transceiver.

The present invention is also particularly advantageous because, in various embodiments, it automatically selects the best search option for the user. For instance, in one embodiment, if the locator unit comes within a certain distance of the transceiver, the locator unit will instruct the transceiver to activate its indicator, such as a tone or light, to assist the user in locating the transceiver. In various embodiments, other functions can also be automated, thereby eliminating the need for the user to make decisions. For instance, in one embodiment, if the locator unit is experiencing interference in receiving a signal from a transceiver, the locator unit can request the user to move the locator unit to a different position. In a further embodiment, the locator system can automatically vary the signal strengths of the search and return signals, and can tune the receivers and transmitters of the locator unit and receiver to optimize performance. In these embodiments, the present invention presents the user with a wide range of search options, and can also select the options best suited to the environment in which the user is in. This eliminates the need for the user to make such decisions, thereby simplifying the search process for the user, while at the same time optimizing the search and locate performance.

In one embodiment, the article locator system includes a locator module and a transceiver. The locator module includes a first memory unit operable to store one or more first address codes, a user control operable to allow a user to select one of the stored first address codes, a first transmitter operable to wirelessly transmit a locator signal, wherein the locator signal includes one of the selected first address codes, a first receiver operable to receive a return signal transmitted by a transceiver module, and an antenna array operably connectable to the first transmitter and the first receiver. In one embodiment, first receiver is only active for a limited period after the locator signal is sent. The first control unit is operable to calculate a relative direction of the transceiver module from the locator module. The first control unit is linked to the first memory unit, the user control, the first transmitter, and the first receiver. The locator module can also further include a display screen linked to the first control unit.

In one embodiment, the locator module sends commands to said transceiver module. In one embodiment, the first transmitter transmits the first address code using frequency shift keying. In one embodiment, the locator signal includes a spread spectrum signal, an ultra wide band signal, a wideband FM signal, or a CDMA signal.

The transceiver includes a second memory unit operable to store a second address code. In one embodiment, the second memory unit is also operable to at least temporarily store a session identifier. The transceiver also includes a second receiver operable to receive the locator signal transmitted from the locator module a second transmitter operable to wirelessly transmit the return signal, and a second control unit operable to compare the selected first address code transmitted by the locator module with the second address code. If the two codes are the same, the second control unit activates the second transmitter to wirelessly transmit the return signal. The second control unit is linked to the second memory unit, the second receiver, and the second transmitter. The transceiver also includes a timer linked to the second receiver and the second control unit. The timer is operable to activate the second receiver and second control unit at a specified time interval and for a specified time period. In one embodiment, the timer is a real time clock.

The transceiver can include an outer housing that can be waterproof. The transceiver module can also include a battery that is operable to power the second memory unit, the second receiver, the second transmitter, the second timer, and the second control unit. In one embodiment, the transceiver module is powered by radio frequency energy.

In one embodiment, the transceiver includes a sensor linked to the second control unit. In one embodiment, the sensor is operable to measure temperature. The transceiver can also further include an indicator linked to the second control unit.

In another embodiment, the locator module further includes a second timer linked to the first. The second timer is operable to determine the time between when the locator signal is transmitted to when the return signal is received. The first control unit operable to calculate a distance of the transceiver module from the locator module. In another embodiment, the locator unit includes a real-time clock. In one embodiment, the real time clock is programmable to activate the second receiver at specified times. In yet another embodiment, the real time clock is operable to be programmed by the locator module.

In one embodiment, the locator module is configured to allow the user to specify a known distance from the locator module to the transceiver module, use the known distance to determine an expected time period between when a locator signal is sent to the transceiver module to when the return signal should be received by the locator module, measure an actual time period from when the locator signal is sent to the transceiver module to when the return signal is received by the locator module, obtain an electronic system delay time by subtracting the actual time period from the expected time period, and store the electronic system delay time in the first memory unit.

In another embodiment, the locator unit includes a first sensor operable to measure a first temperature. The transceiver comprises a second sensor operable to measure a second temperature. The first and second temperatures can be used in calculating the system delay time.

In one embodiment, the locator unit calculates the distance of the transceiver module from the locator module by determining a total time elapsed from when the locator signal is sent to when the return signal is received by the locator device, subtracting an electronic system propagation delay time, and dividing by two. In another embodiment, the locator module determines distance to the transceiver module by switching between antennas in the antenna array according to a commutation frequency selected to minimize a tone output from said first receiver. In yet another embodiment, the locator module determines distance to the transceiver module by switching between antennas in the antenna array according to a commutation frequency selected to minimize a tone output from said first receiver. The commutation frequency can be swept across a desired range of frequencies.

In a further embodiment, the locator module is configured to measure a phase delay between a tone transmitted to the transceiver module and a tone received from the transceiver module. In one embodiment, the locator module is configured to calibrate to the transceiver module. Specifically, the locator module configured to measure a phase delay between a tone transmitted to the transceiver module and a tone received from the transceiver module when said transceiver module is relatively close to the locator module, convert the phase delay to a time delay, and store the transceiver delay time. In one embodiment, the first control unit of the locator unit is further operable to measure and store a signal processing time delay through the electronic system.

In one embodiment, the locator module further includes a switch to operably connect said first receiver to said antenna array. In one embodiment, the control unit controls a commutation rate of said switch.

In one embodiment, the locator module includes a conflict detection receiver that is linked to the first control unit and operable to detect a second locator signal transmitted from a second locator module. The first control unit can be further operable to delay the transmission of the locator signal from the first transmitter unit when the conflict detection receiver detects the second locator signal. In one embodiment, the conflict detection receiver can be integral with the first receiver.

The antenna array of the locator unit can include one or more antennas. The antennas can be pivotally coupled to the locator module. In one embodiment, the antenna array comprises two or more antennas coupled to the locator module and arranged in a circular path. In one embodiment, there are three or more antennas. In one embodiment, the first control unit is further operable to determine the strength of the return signal received at each of the antennas, and is operable to select the antenna receiving the strongest return signal. In one embodiment, the antennas are monopole-type antennas, dipole-type antennas, or patch-type antennas. In one embodiment, the locator module determines bearing to the transceiver module by switching between antennas in the antenna array and using Doppler processing to determine a direction of a wireless signal received from the transceiver module.

The locator unit can also include an internal compass unit operable to convert a relative direction of the transceiver module to a magnetic bearing. In one embodiment, the article locator system further includes a third transmitter operable to send a first signal to a second locator unit, and further including a third receiver operable to receive a second signal from a second locator unit. The article locator system can also include one or more additional locator units, wherein the locator unit and the additional locator units are connected by a communication path. This communication path can be a variety of pathways, including the internet.

The present invention is also directed to a method for locating an object. The method includes attaching a transceiver to the object. The transceiver includes a first receiver operable to receive a locator signal that contains a first address code, a first transmitter operable to wirelessly transmit a return signal, a first control unit operable to compare a second address code stored in a first memory unit with the address code contained in the locator signal. If the two codes are the same, the first control unit can wirelessly transmit the return signal. The first control unit is linked to the first memory unit, the first receiver, and the first transmitter. The transceiver also includes a first timer linked to the first receiver and the first control unit, the first timer operable to activate the first receiver and first control unit at a specified time interval and for a specified time period.

The method also includes entering and storing the first address code in a locator unit. The locator unit includes a second memory unit operable to store the first address code, a user control operable to allow a user to input the first address code and select the first address code after it has been entered and stored, a second transmitter operable to wirelessly transmit the locator signal, wherein the locator signal includes the selected first address code, a second receiver operable to receive the return signal transmitted by the transceiver module, one or more antennas linked to the first receiver, and a second control unit operable to calculate a relative direction of the transceiver module from the locator module. The second control unit is linked to the second memory unit, the user control, the second transmitter, and the second receiver.

The method further includes selecting the first address stored in the locator unit and activating the locator unit to wirelessly transmit the first address code to the transceiver. If the transceiver receives the locator signal containing the first address code and verifies that the first address code matches the second address code stored in the transceiver, the return signal is sent from the transceiver to the locator module, and the locator module analyzes the return signal to determine the relative direction of the transceiver.

The locator unit can further include a second timer linked to the second control unit that is operable to determine a time between when the locator signal is transmitted to when the return signal is received. The second control unit can be further operable to calculate a distance of the transceiver module from the locator module.

In one embodiment, the first timer activates the first receiver and the first control unit for a period of time at regular intervals. In another embodiment, the first timer is a real-time clock, and the user can program the real time clock to activate the first receiver and the first control unit at predetermined times.

In another embodiment, the present invention is directed to a system that includes a locator module and a transceiver. The locator module includes a first radio frequency transmitter operable to transmit a first address code, a first receiver configured to receive a return signal transmitted by a second transmitter, an antenna array operably connectable to the first transmitter and the first receiver by a switch, and a first control unit operable to control the switch. In one embodiment, the first address code is sent using frequency shift keying or phase shift keying. In one embodiment, the first control unit is operable to determine the bearing of a transceiver module from the control unit. In another embodiment, the first control unit is operable to determine the distance of a transceiver module from the control unit. In yet another embodiment, the first control unit is operable to determine both the bearing and the distance of the transceiver module from the control unit. In one embodiment, the first control unit controls a commutation rate of the switch. The locator module can also further include an internal compass unit operable to convert a relative direction of the transceiver module to a magnetic bearing. In one embodiment, the locator unit is operable to send commands to the transceiver.

The transceiver module includes a second receiver operable to receive the signal transmitted by the first transmitter, a second transmitter operable to transmit the return signal, and a second control unit operable to compare the first address code transmitted by the locator module with an address code stored in the transceiver module. If the two codes are the same, the second control unit activates the second transmitter to transmit the return signal. In one embodiment, the transceiver includes a timer operable to activate the second receiver and second control unit at a specified time interval and for a specified time period.

In one embodiment, the first control unit is further operable to calibrate and store a signal processing time delay through the transceiver module. In one embodiment, the distance from the locator module to the transceiver is calculated by determining a phase delay between a transmitted tone frequency modulated onto a first carrier and a received tone frequency modulated onto a second carrier.

In one embodiment, the locator module determines range to the transceiver module by commutating between antennas in the antenna array according to a commutation frequency selected to minimize a tone output from said first receiver. In another embodiment, the locator module determines range to the transceiver module by switching between antennas in the antenna array according to a commutation frequency selected to minimize a tone output from said first receiver. The commutation frequency is swept across a desired range of frequencies.

In yet another embodiment, the locator module is configured to measure a phase delay between a tone transmitted to the transceiver module and a tone received from the transceiver module. In one embodiment, the locator module is configured to calibrate to the transceiver module. Specifically, the locator is configured to measure a phase delay between a tone transmitted to the transceiver module and a tone received from the transceiver module when said transceiver module is relatively close to the locator module, convert the phase delay to a time delay, and store the system delay time.

In one embodiment, the locator module determines bearing to the transceiver module by commutating between antennas in the antenna array and using Doppler processing to determine a direction of a wireless signal received from the transceiver module.

In another embodiment, the present invention is directed to an apparatus that includes a locator module and a transceiver. The locator unit includes a means for transmitting a first address code using a first frequency band across a wireless channel, a means for receiving a return signal transmitted in a second frequency band in response to said first address code, an antenna array operably connectable to the means for transmitting and the means for receiving, and a means for determining a distance to a source of said return signal by commutating among antennas in said antenna array.

The transceiver includes a means for receiving a first frequency band signal containing a transmitted address code, a means for comparing the transmitted address code with a stored address code, a means for transmitting a second frequency band loop-back tone return signal for a specified period of time when said transmitted address code matches said stored address code, and a means for activating the means for receiving at desired intervals.

In another embodiment, the present invention is directed to a method for range determination. The method includes providing an unmodulated carrier signal at a first frequency to a switch, the switch configured to commutate among antennas in a antenna array at a commutation frequency to transmit a first modulated signal modulated according to the commutation frequency. The method also includes receiving the modulated signal in a tag receiver, an output of the tag receiver provided to a tag transmitter, transmitting a second modulated carrier from said tag transmitter, the second modulated carrier modulated according to said commutation frequency, receiving the second modulated carrier in a second receiver, adjusting said commutation frequency to minimize an output of the second receiver; and calculating a distance based on said commutation frequency.

DETAILED DESCRIPTION

A. Overview

The present invention is directed to a radio frequency location system in which a locator device is used to determine the distance and/or bearing from the user's location to one or more transceiver devices. One embodiment of this invention is illustrated in FIGS. 1–6.

Figure 1:
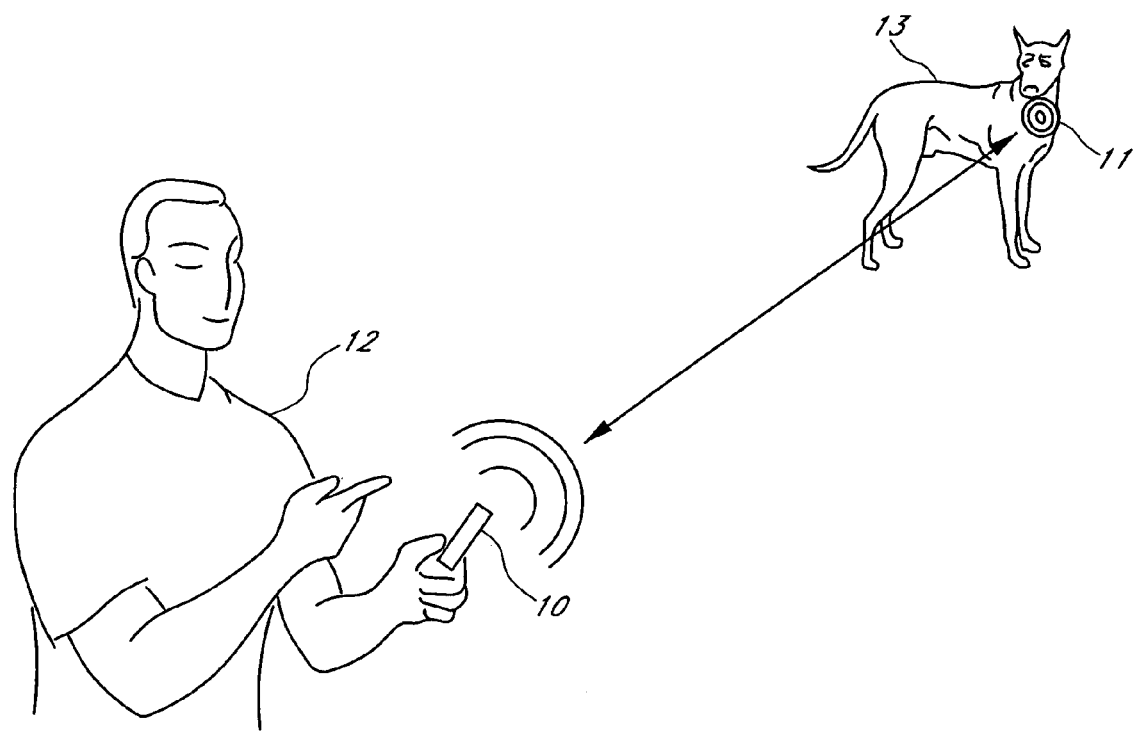
FIG. 1 is a perspective view showing one embodiment of the present invention.

FIG. 1 illustrates the general operation of one embodiment of the locator system of the present invention. A transceiver 11 has been previously attached to an object (in this case is a dog 13) that a user 12 now wishes to locate. It will be understood that the application of the disclosed invention is not limited to the location of any particular type of object. The objects to be located using the disclosed invention include mobile objects such as a person, child, or pet, as well as stationary items of personal property such as wallets, keys, remote control devices, tools, parked vehicles and any other object which may from time to time need to be located by its owner or caregiver.

The user 12 selects the transceiver 11 he wishes to locate from a list of previously stored transceiver address codes in a handheld locator unit 10. The locator 10, when activated by the user 12, sends a modulated radio frequency signal including the digital address code selected from the list of stored codes in the locator 10. In one embodiment, the transceiver 11 periodically activates its radio frequency receiver and checks for the presence of transmissions of the form emitted from the locator 10. If a transmission is detected, the transceiver 11 receives the digital address code transmitted by the locator 10 and compares the received address code with a stored address code within the transceiver 11. In one embodiment, each transceiver 11 has a unique stored address code.

If the digital address code transmitted by the locator 10 matches the code stored in the transceiver 11, the transceiver 11 will activate its transmitter and send a short duration RF signal back to the locator 10 to facilitate determining the distance and/or direction from the user's position to the selected transceiver 11. Various embodiments of the present invention are contemplated. For example, in one embodiment, the locator unit 10 is operable to determine the distance of the transceiver 11 from the locator unit 10. In another embodiment, the locator unit 10 is operable to determine the bearing of the transceiver 11 from the locator unit 10. In yet another embodiment, the locator unit 10 is operable to determine both the distance and bearing of the transceiver 11 from the locator unit 10. Other embodiments in addition to these are also described herein.

B. Transceiver

In one embodiment, the transceiver 11 is small in size such that it easily can be attached to a variety of objects, even if the objects are small. The transceiver 11 can be permanently affixed to the object, or it can be attached in such a way that it can be removed if desired. For example, the transceiver 11 can be attached to the object by an adhesive, a clip, or can be tied to the object. The transceiver 11 can also be designed such that it can be worn on a necklace, bracelet, or collar. The housing of the transceiver 11 can be made from a variety of material. The material is preferably durable in nature, and in the one embodiment, the housing is made from plastic.

Figure 2:
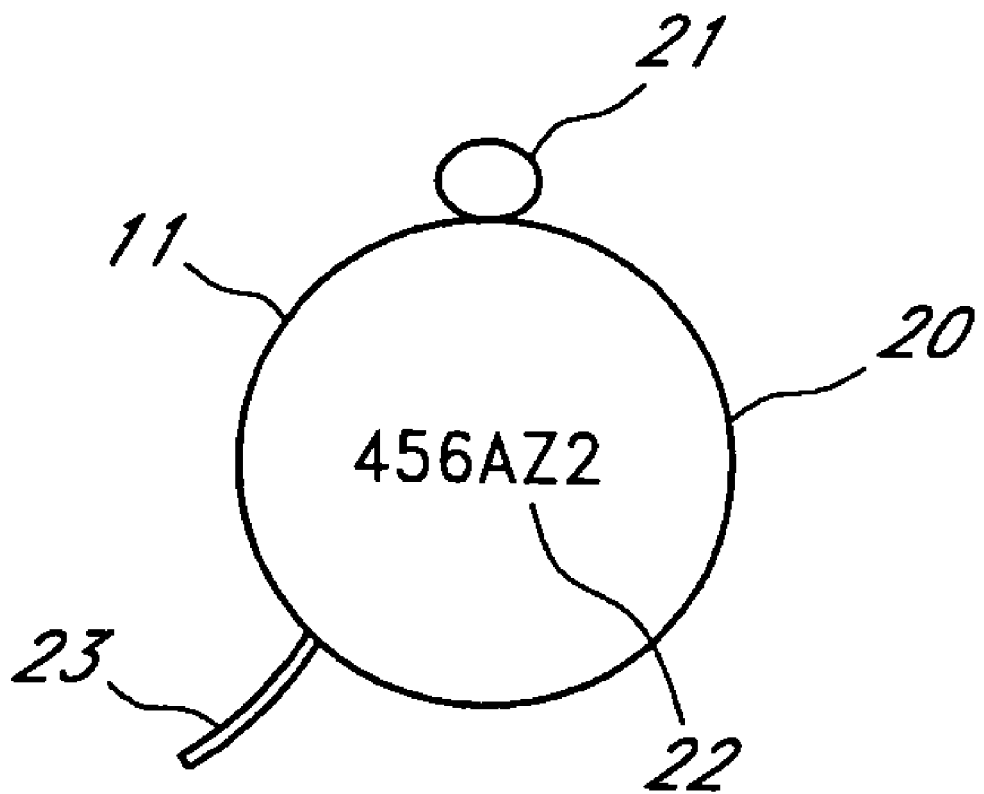
FIG. 2 is a front view of a transceiver device with marked serial number.

FIG. 2 illustrates one embodiment of a transceiver 11 having an outer casing 20 preferably of waterproof and shock resistant design, an attachment mechanism 21 and a marking depicting an internally stored device address code 22. In one embodiment, the transceiver 11 may have an antenna 23 protruding from the outer casing 20. This embodiment is an example of one way the transceiver 11 can be made to attach to, for example, a dog collar or a key chain.

The relatively small size of the transceiver 11 allows it to remain virtually unnoticed even when attached to an object. Because the transceiver 11 is non-obtrusive when attached to an object, it can be permanently left on the object and cause little or no interference or inconvenience to the user of the object. Therefore, the transceiver 11 can be attached to the object many months, and even years, prior to the time the owner or caregiver wishes to locate the object. Although it is preferable to make the transceiver 11 small in size, those skilled in the art will realize that transceivers of varying larger sizes can also be constructed and utilized in situations where it is not necessary or desirable to have a small transceiver.

Figure 3A:
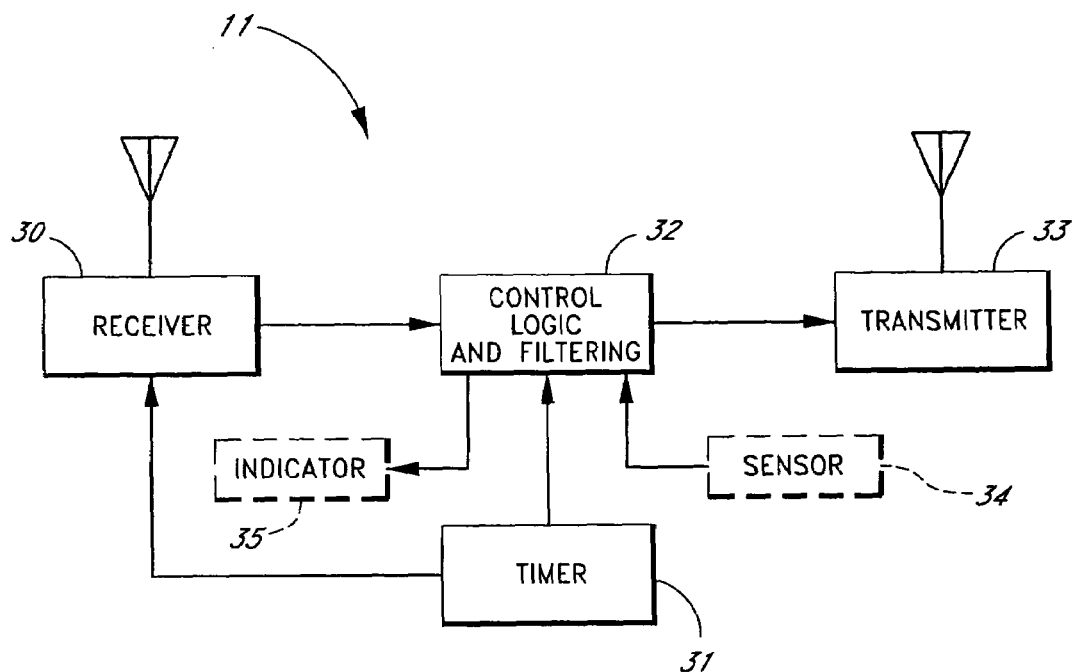
FIGS. 3A and 3B are schematic block diagrams illustrating the components of a transceiver device.
Figure 3B:
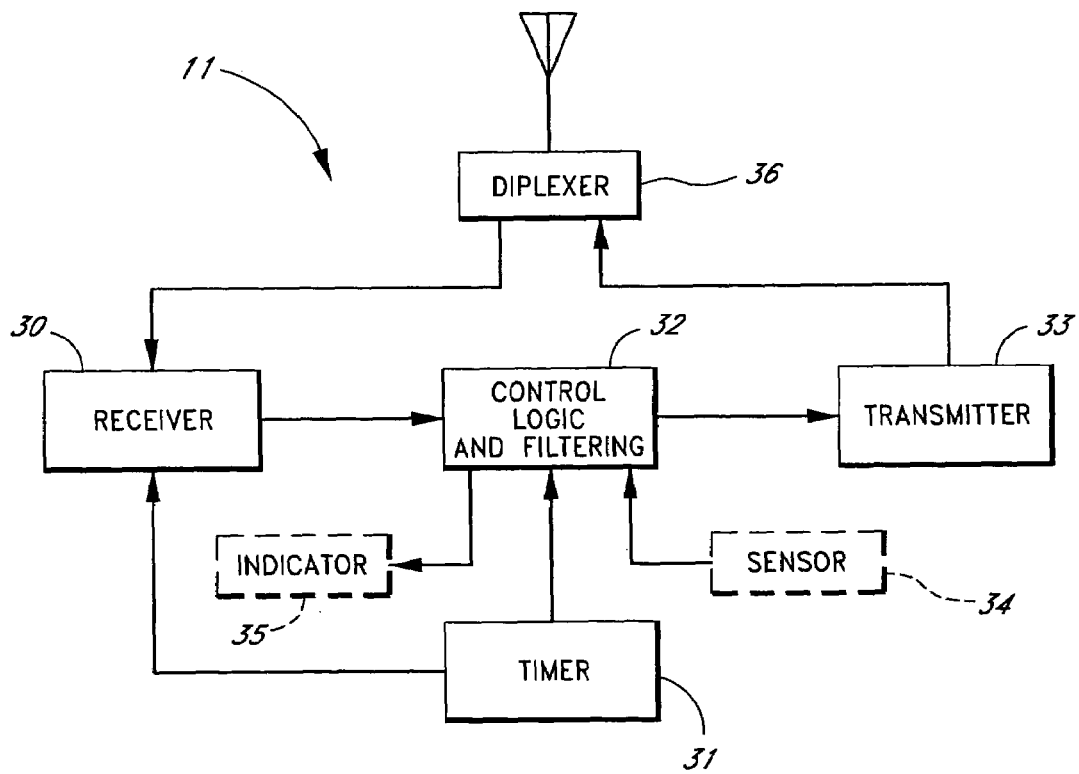

FIG. 3A illustrates a schematic block diagram of one embodiment of the transceiver 11 of the present invention. FIG. 3B illustrates another embodiment of the transceiver 11 in which the receiver 30 and transmitter 33 are each coupled to a diplexer 36. A receiver 30 and a control unit 32 are activated by a timer 31 at substantially regular time intervals for a period of time sufficient to determine if the locator device 10, within the effective range of the RF signal, is transmitting a device address code. If a signal is detected during the activation period, the control unit 32 and receiver 30 will remain activated until a complete address code is received or the signal is no longer present. If the received address code matches the address code stored in the transceiver 11, the control unit 32 activates a transmitter 33. The transmitter 33 then sends a relatively short-duration RF return signal.

The transceiver 11 can be set to be activated at intervals that are best suited for the application in which the transceiver will be used. It should be noted that it is the receiver 30 and control unit 32 of the transceiver 11 that are activated at the determined intervals. The transmitter 33 is activated when an address code is received from a locator unit 10 that matches the address code stored in the transceiver 11. For example, if the transceiver is being affixed to livestock, it will not be necessary for the user to receive a virtually continuous update of the position of the livestock. Therefore, the time intervals between the activation of the transceiver can be relatively long. For example, in one embodiment, the time interval between each activation can be from 5 to 15 minutes. If the user desires to be able to locate an object more quickly, the time interval between each activation of the transceiver 11 can be reduced. For example, in one embodiment, the time interval between each activation can be from 2 to 5 seconds. It will be apparent to those skilled in the art that the time intervals between each activation can readily be set to be any desired duration.

If no locator signal with a matching address code is detected within a predetermined period of time, the receiver 30 and control unit 32 will turn off, and the transceiver 11 will enter into stand-by mode. The receiver 30 and control unit 32 will be activated by timer 31 again at the next preset interval. In one embodiment, the transceiver 11 stays activated for between 5 and 10 msec once it has been activated. Those skilled in the art will realize that the transceiver 11 can be set to remain activated for varying lengths of time.

The timer can be preset during the manufacture of the transceiver 11. In one embodiment, the timer 31 is a real-time clock that can activate the receiver 30 at intervals or at a specified time and date. In one embodiment, the real-time clock preferably operates on low power levels (i.e., less than 3 microwatts). The presence of a real time clock allows the transceiver 11 to enter a low-power sleep mode until a specified time duration has elapsed or until a programmed time and date has been reached. When the programmed wakeup condition has been met, the real time clock has the ability to power up the RF receiver 30 and control unit 32 in the transceiver 11 to determine if a locator unit 10 is transmitting an address code.

Each transceiver 11 also has a memory unit that is operable to store a unique address code for that transceiver 11. The memory unit can be any conventional memory means, such as non-volatile memory, volatile memory, programmed switches, wire jumpers, and the like. The memory unit can be linked to the control unit, and can be integral with the control unit 32 such that the control unit 32 also operates as the memory unit. In one embodiment, the address code is permanently stored in the memory unit. For example, the address codes can be entered and permanently stored in the transceiver 11 during the manufacturing process.

In one embodiment, a session ID can also be temporarily stored in the memory unit. In this embodiment, the user can use the locator unit 10 to enter or remove addresses in the transceiver 11. As discussed in more detail herein, this may be desirable when the user wishes to track a group of transceivers 11. In this embodiment, the locator unit 10 can be used to send a temporary session ID to the transceiver 11. This session ID is saved in the transceiver 11, and contains less data than the unique ID that differentiates all transceivers 11 from one another and therefore can be more efficiently communicated. Preferably, the transceiver 11 utilizes non-volatile memory so that session ID's and other data set to the transceiver 11 from a locator unit 10 will be preserved during the low-power sleep intervals when power is removed from the processor circuitry. As discussed in more detail herein, this embodiment is particularly useful when a group of transceivers 11 is being tracked by the locator unit 10.

Each transceiver 11 also includes at least one receiver 30. The receiver 30 is used to receive an RF locator signal containing a digital address code that is sent by the locator unit 10. Preferably, the receiver 30 is tuned to the frequency of the search signal that is sent by the control unit. When the receiver 30 receives the locator signal, the digital address code contained in the signal is output by the receiver 30 to a control unit 32, which is linked to the receiver 30.

In one embodiment, the control unit 32 includes a microprocessor. In one embodiment, the control unit 32 can also contain a filtering mechanism. In the case where a complete address code is received, the control unit 32 compares the received address code with the address code stored within the memory unit. If the address codes match, the control unit 32 activates the transmitter 33 that is linked to the control unit. The transmitter 33 then sends a relatively short-duration RF return signal to the locator unit 10. The transmitter 33 is activated for a time interval of sufficient duration to allow the locator unit 10 that is the source of the transmission to determine the distance and bearing of the returned signal. In one embodiment, the duration of the signal transmitted is less than one second. In one embodiment, the duration is approximately 5 msec.

In one embodiment, the control unit 32 can be further operable to increase or decrease the time interval between activations of the receiver 30 depending on the usage history of the system. For example, if a signal has not been detected at the output of the receiver 30 by the control unit 32 after a predetermined amount of time, the time interval between activations can be increased to reduce the power consumption of the transceiver 11, thereby increasing the life of the battery. Conversely, if an address code matching the stored address code has been received within a predetermined time period, the time interval between activations of the receiver 30 can be reduced to provide a faster response time for successive searches for that transceiver 11.

Because only the transceiver 11 having an address code that matched the address code contained in the locator signal will transmit a response signal, and because each transceiver 11 can be manufactured with a permanently stored address code or can contain a temporarily stored address code, the signal sent back from the transceiver 11 to the locator unit 10 need not include the address code in all embodiments. Thus, in one embodiment, the content of the RF signal transmitted from the transceiver 11 is substantially the same for every transceiver 11 device. The individual transceiver 11 devices are distinguished by transmitting an RF response signal within a narrowly defined time window after receipt of the digital address code, thereby eliminating the complications that would arise if the system design required the transceiver 11 device to transmit the stored digital address code back to the locator unit 10 as part of the response signal. In one embodiment the response signal preferably has a frequency between 902 MHz and 904 MHz, although those skilled in the art will realize that a variety of other higher and lower frequencies can readily be used.

The method of operation of the transceiver 11 offers a number of advantages. First, the transceiver 11 design can be simplified because there is no need for a digital code modulator. Thus, in one embodiment, the transceiver 11 is not required to send a digitally modulated signal back to the locator unit 10. Second, the required RF receive level at the locator unit 10 is reduced because a digitally modulated signal need not be decoded thereby increasing the effective range of the system. Third, the power consumption in the transceiver 11 is reduced because the duration of the required transmission is reduced. The power consumption of the transceiver 11 is also reduced because the transceiver 11 can be made such that it has relatively few operational components. Additional advantages are also realized from making such a transceiver. For example, the transceiver 11 can be made with relatively minimal cost. If a transceiver 11 becomes broken or lost, the user can replace it with minimal expense.

In one embodiment the locator unit 10 transmits a digitally modulated locator signal using frequency shift keying. Those skilled in the art will realize that other methods, such as phase shift keying, may also be used. In one embodiment, the locator signal is sent at 1200 baud, although those skilled in the art will realize that other speeds may also be used. In one embodiment, the address code is transmitted from the locator unit 10 to the transceiver 11 at two frequencies, 902 MHz and 904 MHz. Higher and lower frequencies may also be used. Those of ordinary skill in the art will realize that frequency hopping schemes, spread spectrum, CDMA, pulsed communications systems such as Ultra Wideband, and wideband FM can also be used.

As previously stated, if the address code sent by the locator unit 10 matches the address code stored in the transceiver 11, the transceiver 11 will send a response signal back to the locator unit 10. In one embodiment, the transceiver 11 initially sends an unmodulated, continuous wave signal to the locator unit 10. The locator unit 10 analyzes this signal to determine the relative bearing of the transceiver 11, as discussed later herein. In one embodiment, after receiving the unmodulated signal from the transceiver 11, the locator unit 10 directs the transceiver 11 to go into loop back mode. In another embodiment, the transceiver 11 can automatically enter loop back mode after it transmits the unmodulated signal for a determined time period. Upon entering loop back mode, the locator unit 10 sends a carrier signal that is FM modulated. In one embodiment, the carrier signal is sent at 902 MHz, and the carrier signal is FM modulated at 1800 Hz. Those skilled in the art will realize that other higher and lower frequencies may also be used.

After receiving the signal, the transceiver 11 demodulates it and extracts the 1800 Hz tone. A return FM modulated signal is then sent from the transceiver 11 back to the locator unit 10. In one embodiment, the return signal is not independently generated in the transceiver 11. Instead, the transceiver 11 simply loops back the signal received from the locator unit 10. In one embodiment, the return signal is sent at 922 MHz and the signal is FM modulated at 1800 Hz. Those skilled in the art will realize that other higher and lower frequencies may also be used. The locator unit 10 can then determine the distance to the transceiver 11 by analyzing the return signal sent by the transceiver 11. Specifically, distance between the locator unit 10 and the transceiver 11 is related to the shift in phase between the signal sent by the locator unit 10 and the signal received by the transceiver 11. The locator unit 10 determines the change in phase between the signal it sent and the signal it received from the transceiver 11, and from this change in phase it can determine the distance to the transceiver 11.

This calculation is based on the assumption that there is not processing delay time in either the transceiver 11 or the locator unit 10. In reality, there will be some processing delay. This delay will result in a larger change in phase between the signal sent by the locator unit 10 and the signal received from the transceiver 11, thereby giving the appearance that the distance to the transceiver 11 is larger than it actually is. To compensate for this processing time delay, in one embodiment, a standard processing delay time may be entered into the locator unit 10. The locator unit 10 can use this standard processing delay time when calculating the distance to the transceiver 11 in order to compensate for the actual processing delay time of the transceiver 11. In another embodiment, the actual system delay time for each transceiver 11 can be determined through a calibration process. This calibration process is discussed in more detail herein.

In one embodiment, the transceiver 11 also includes a battery to provide power to the timer 31, control unit 32, receiver 30, and transmitter 33. In one embodiment, the battery is a sealed lithium battery, although those skilled in the art will realize that other types of batteries can also readily be used. The internal battery preferably is permanently mounted and provides a service life of several months to several years. In another embodiment, the transceiver 11 does not include a battery, but is instead derives its power from RF energy. This RF energy may come from the signals emitted by the locator unit 10 during a search, or may come from other sources, such as television or radio signals. In one embodiment, if the battery power of the transceiver 11 decreases to a predetermined point, the transceiver 11 can send a signal to the locator unit indicating that its battery level is low. In one embodiment, the transceiver 11 notifies the locator unit 10 that its battery level is low the next time the locator unit 10 addresses the transceiver 11. The transceiver 11 can send the information in the interval after the loop back mode. In one embodiment, this information is transmitted using frequency shift keying. In yet another embodiment, the transceiver 11 may be connected to an external battery source. This would allow the transceiver 11 to remain constantly activated. In one embodiment, if the transceiver 11 was connected to an external power source, it would not be necessary for the transceiver 11 to have a timer, as it would not be necessary for the transceiver 11 to turn itself on at specified time intervals, as the transceiver 11 could always remain on.

The transceiver 11 can be constructed to meet the needs of the particular environment in which it is to be used. For instance, if the transceiver 11 will be attached to an object that is likely to remain in the user's home, the transceiver 11 will likely remain within a close range of the user. As a result, the transceiver 11 will only be required to transmit its return signal over a short range in order to be located by the nearby locator unit 10. The absence of the need for relatively large components that transmit a high powered signal allows the transceiver 11 to be small in size. Such a transceiver 11 can be powered by a battery or it can lack a battery and instead derive its power from the RF energy.

Because in one embodiment the transceiver 11 can derive its power from RF energy, such as the energy emitted by the locator unit 10 during a search, it does not require any power when it is in "stand-by mode," that is, the periods when the transceiver 11 remains inactive (i.e. neither its receiver 30 nor transmitter 33 is active). The transceiver 11 can be activated when an RF signal is received within a certain frequency band. This RF energy is rectified and used to power the active circuitry which then awaits the reception of a coded address signal. If the transceiver 11 receives its unique address, it then activates its transmitter to reply with a generic, modulated RF signal that is common to all transceivers 11. The system design allows enough time between interrogations for the transceiver 11 to build up enough energy to activate its transmitter. In this way, a locator unit 10 can repeatedly interrogate a transceiver 11 and update the range and bearing information to the user. This embodiment allows the user to attach the transceiver 11 to an article and search for it months or years later without having to worry about maintaining a battery.

Another embodiment of the transceiver 11 is particularly well adapted for outdoor use. This embodiment is characterized by a relatively long range of operation, but a limited battery life. In one embodiment, the transceiver 11 comprises a sealed battery that powers its receiver and transmitter. The transceiver 11 is approximately 25 mm diameter and 12 mm thick. This size is of sufficient compactness that the transceiver 11 can easily be worn on a pet's collar or attached to a toddler. The transceiver 11 has a range of approximately 1 miles, which defines an area over 2000 acres, thereby providing search capabilities over an extended area such as a neighborhood or amusement park.

In this embodiment, the transceiver 11 draws a very small amount of power from its internal battery when it is in stand-by mode. This allows transceiver 11 to remain active for up to 5 years without needing to be replaced. In one embodiment, when the transceiver 11 receives a modulated preamble signal from the locator unit 10, it powers up its decoding circuitry and awaits its coded address signal. Upon receiving its address signal the transceiver 11 will power up its transmitter and respond in the manner of the indoor transceiver 11. The actual life of the outdoor transceiver 11 embodiment will depend on the number of times it has been searched for and the total duration of the searches. In one embodiment, if the outdoor transceiver 11 detects that its battery is nearly discharged, it will respond to the locator unit 10 with a different code or modulation frequency. This will allow the locator unit 10 to alert the user that the transceiver 11 is in need of replacement. Furthermore, if the transceiver 11 is to be used outdoors, it can be sealed in a weatherproof or waterproof casing to prevent it from becoming damaged by exposure to the elements. It will be readily apparent that this embodiment of the transceiver 11 does not have to be limited to application outdoors, but can also be used indoors if desired.

In one embodiment, the transceiver 11 can also include one or more sensors 34 and one or more indicators 35 that are linked to the control logic unit 32. The sensor 34 can be adapted to sense one or more of a number of conditions, such as moisture, temperature, user input, shock, acceleration, movement, other medical devices (i.e. monitors for heart rate, breathing rate, and the like), or the battery level of the transceiver 11. For example, in one embodiment the user input may be a panic button. If the panic button is pressed, in one embodiment the transceiver 11 can activate the indicator 35 and/or send a signal to the locator unit 10 indicating that the panic button has been pressed. In one embodiment, this information is sent to the locator unit 10 the next time the locator unit 10 polls the transceiver 11. In one embodiment, the moisture sensor 34 can measure the humidity in the surrounding air. The moisture sensor 34 can be further operable to determine if the transceiver 11 has fallen into water. This application may be particularly useful if the transceiver 11 is attached to a child. In a further embodiment, if the sensor 35 detects that it has become emerged in water, the transceiver 11 can activate the indicator 35 and/or send a signal to the locator unit 10. In one embodiment, this information is sent to the locator unit 10 the next time the locator unit 10 polls the transceiver 11. The temperature sensor 34 can be operable to measure the temperature around the transceiver 11. In more particular embodiments, the temperature sensor 34 can be operable to measure the body temperature of the user of the transceiver 11. The temperature sensor 34 can also be useful in determining if a fire is occurring near the transceiver 11. In one embodiment, the locator unit 10 can also include sensors of the type discussed herein.

Once a predetermined sensor level has been met, the indicator 35 may be activated to alert the user. The indicator may be, for example, a light or a speaker operable to emit a sound. For example, if the temperature goes above or below a specified point, the indicator may be triggered, thereby alerting the user. In a further embodiment, the information obtained by the sensor 34 may be sent by the transceiver 11 to the locator unit 10, thereby allowing the user of the locator unit I/O to monitor the conditions detected by the sensor 34. In one embodiment, this information is sent to the locator unit 10 the next time the locator unit 10 polls the transceiver 11.

This embodiment is also useful in regard to the calibration feature previously discussed. The propagation delay time of a signal through the transceiver 11 and the locator unit 10 may depend on factors such as humidity and temperature. The sensor 34 in the transceiver 11 can measure this information, the information can be sent to the locator unit 10, and the locator unit 10 can use it in calculating changes in the system delay time.

In addition to the specific embodiments discussed herein, those skilled in the art will realize that transceivers 11 according to the present invention can readily be constructed to have varying sizes and transmission ranges to suit the particular need for which the transceiver 11 will be used.

C. Locator Unit

Figure 4:
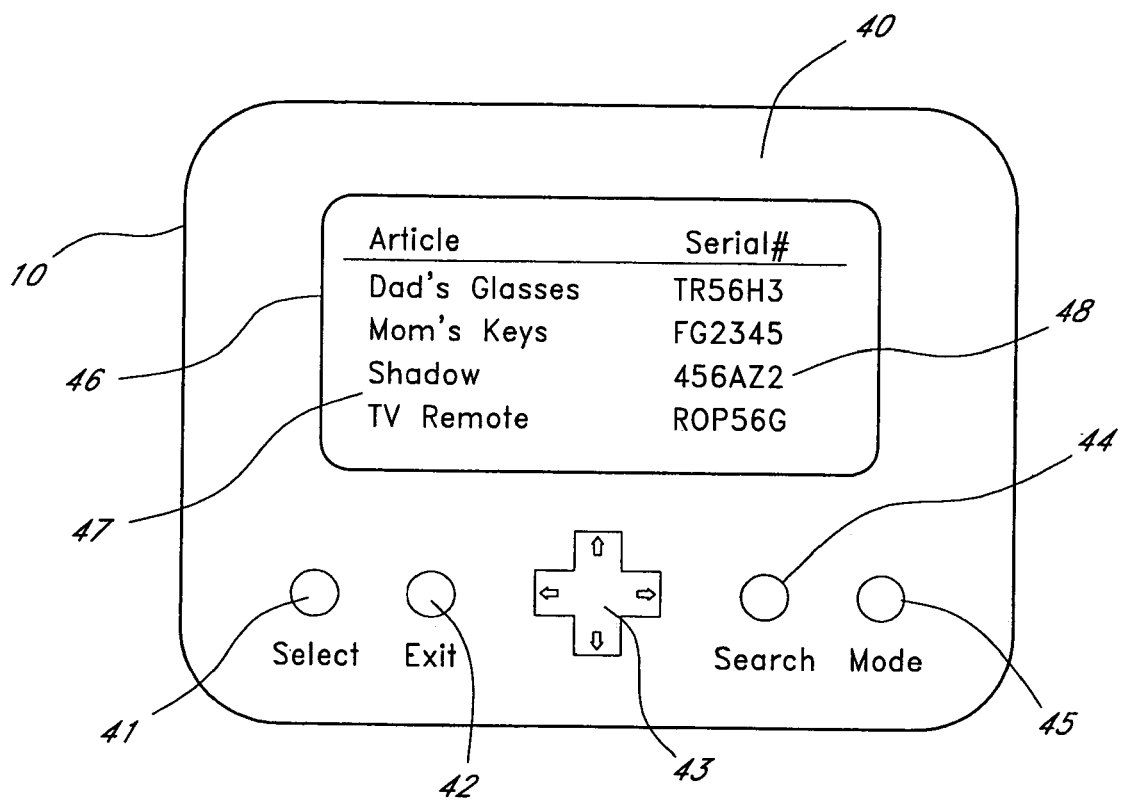
FIG. 4 is a front view of a locator device showing the transceiver selection display and controls.

FIG. 4 illustrates one embodiment of the locator device 10 of the present invention. The housing 40 of the locator device 10 is preferably made of a durable material and is small in size so that the locator device 10 can easily be carried in the hand of the user. The locator unit 10 is typically battery powered. In one embodiment, the locator device 10 includes user controls 41, 42, 43, 44, 45 and a display screen 46, such as an LCD screen with a backlight. Various display elements 47 and 48 are shown on the display screen 46. The user controls allow a user to select from the different operational modes of the locator unit 10, enter data and activate the location function.

Once the user has decided to attach a transceiver 11 to a particular object, the user can use the user controls 41, 42, 43, 44, 45 to enter the address code of the particular transceiver 11 into the memory of the locator unit 10. In one embodiment, the memory is nonvolatile memory, such as electronically erasable programmable read only memory. The memory unit also can be any conventional memory means, such as non-volatile memory, volatile memory, programmed switches, wire jumpers, and the like.

The user can also enter an alphanumeric name to associate with that transceiver 11 which is easily remembered by the user. Once this is done, the user need not remember the device address code but can refer to the transceiver 11 by the alphanumeric name he or she has chosen. The user can scroll through the list of names using the cursor control 43, once the desired object is selected from the list the user can press the search button 44 to begin the search. For instance, as shown on the display screen 46 in FIG. 4, the user has entered the address code "TR56H3" which appears in the serial number column 48, and has entered the name "Dad's Glasses," which appears in the article name column 47, to correspond with that particular address code. If the user wishes to search for the glasses, he can scroll down on the screen to select the name "Dad's Glasses" and begin a search by pressing the search button 44. A search signal will then be sent that includes the corresponding address code, "TR56H3." In one embodiment, the first character of the address code is used to identify the RF channel to which the transceiver 11 has been assigned. This character is not transmitted to the transceiver 11, but is used by the locator unit 10 to tune its transmitter 61 and receiver 62 frequencies to match the channel assignments of the selected transceiver 11.

In one embodiment, the initial signal transmitted by the locator unit 10 has a frequency from 926 MHz to 928 MHz. In one embodiment, these frequencies are in 81 channels spaced at 25 KHz. Those skilled in the art will realize that higher or lower frequencies, different numbers of channels, and different channel spacing may be used. When the user directs the locator unit 10 to search for a specified transceiver 11, the locator unit 10 will transmit a search signal on the channel on which the specified transceiver 11 is operating.

In one embodiment, the transceiver 11 will transmit a response signal that has a frequency from 902 MHz to 904 MHz. In one embodiment, these frequencies are in 81 channels spaced at 25 KHz. Those skilled in the art will realize that higher or lower frequencies, different numbers of channels, and different channel spacing may be used. Frequency plans for one embodiment of the present inventions are shown in table 1. Specifically, table 2 illustrates the frequency values for the first ten channels of this embodiment.

TABLE 1

| Channel # | Locator Unit Transmit Frequency (MHz) | Transceiver Transmit Frequency (MHz) |
|---|---|---|
| 1 | 902.000 | 926.000 |
| 2 | 902.025 | 926.025 |
| 3 | 902.050 | 926.050 |
| 4 | 902.075 | 926.075 |
| 5 | 902.100 | 926.100 |
| 6 | 902.125 | 926.125 |
| 7 | 902.150 | 926.150 |
| 8 | 902.175 | 926.175 |
| 9 | 902.200 | 926.200 |
| 10 | 902.225 | 926.225 |

Thus, if the transceiver 11 to be located was tuned to channel 1, the locator unit 10 would transmit a search signal at 902.000 MHz. The transceiver 11 would transmit a response signal at 926.000 MHz.

Figure 5:
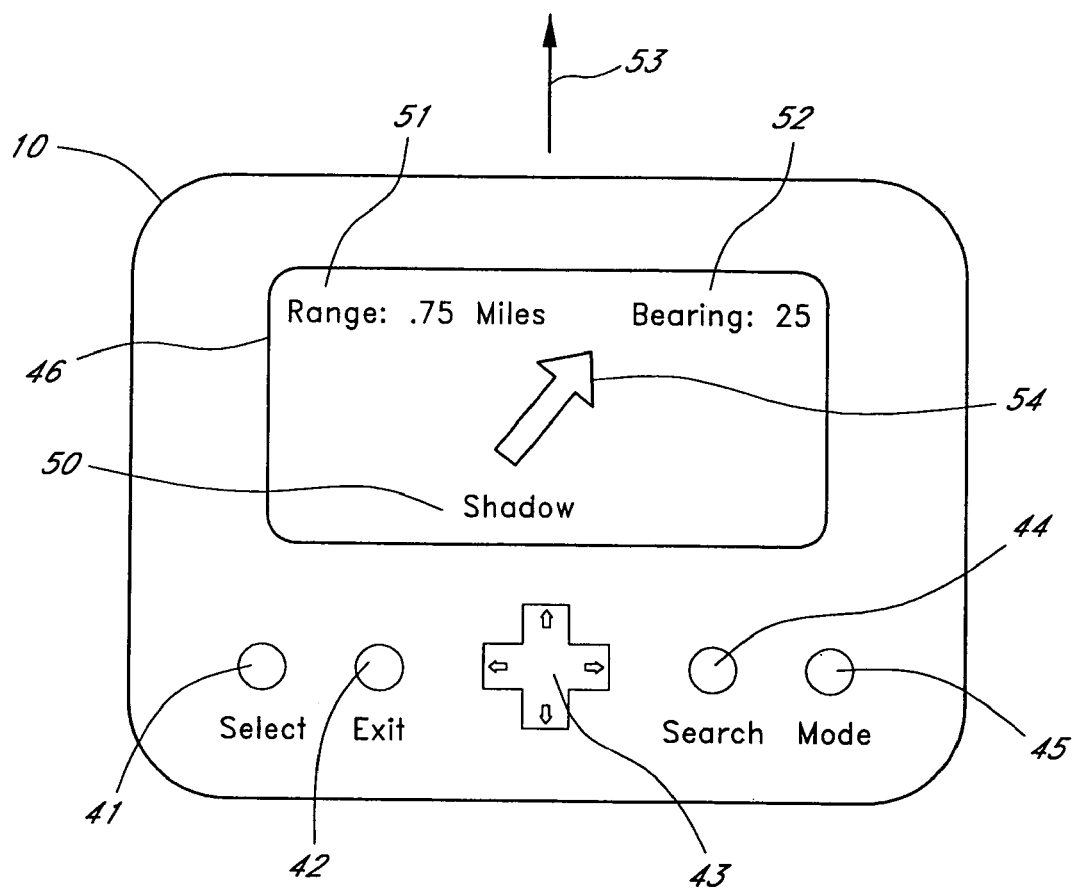
FIG. 5 is a front view of a locator device showing the range and bearing display and controls.

FIG. 5 illustrates the locator device 10 with the display screen 46 displaying the search mode screen. This screen is displayed once the user has initiated a search for a particular object. An object display element 50 verifies the name of the selected object. The range display element 51 indicates the distance from the locator's position to the transceiver 11 having the selected address code. A bearing display element 52 indicates the bearing of the signal received from the transceiver 11 having the selected address with respect to a center axis 53 of the locator unit 10, with a bearing of 0 (zero) degrees indicating that the transceiver 11 having the selected address is directly in front of the locator unit 10 when the locator is held so that the top surface is parallel to the ground. Directional display element 54 provides a graphical representation of the bearing of the signal received from the transceiver 11 having the selected address. It will be readily apparent that other information useful to the user can also be displayed on the screen.

Figure 6:
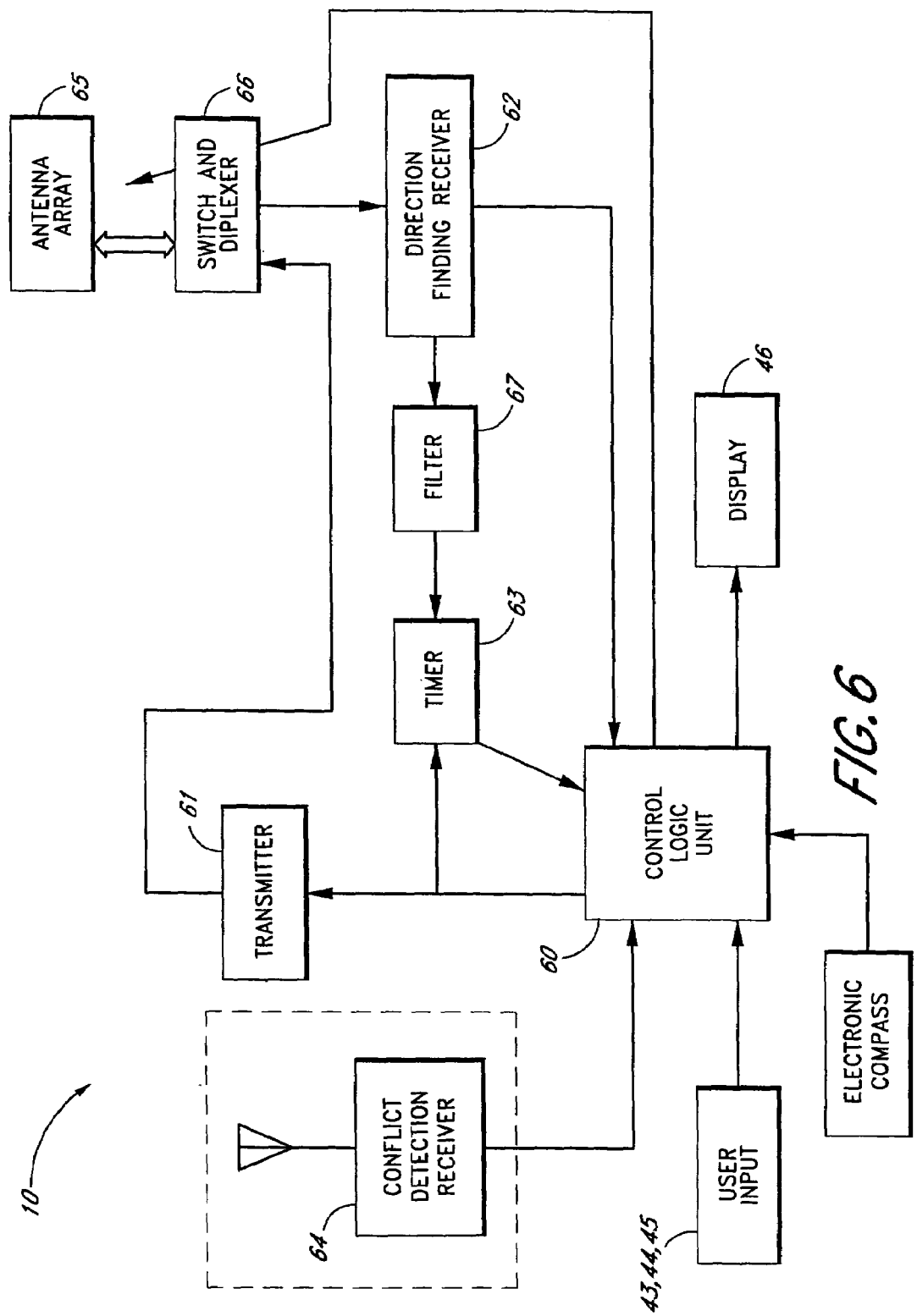
FIG. 6 is a schematic block diagram illustrating the components of a locator device.

FIG. 6 is a block diagram of one embodiment of the locator unit 10. The locator unit 10 includes a control unit 60, which in one embodiment includes a microprocessor. The control unit 60 accepts input from the user input units 41, 42, 43, 44, and 45, processes the input, and produces the appropriate display on the display screen 46. The user can enter the device address codes and the desired alphanumeric names as previously described, and this data will be stored in nonvolatile memory within the control unit. Alternatively, the memory unit can be external to the control unit 60.

When the user selects a particular transceiver 11 that he or she wishes to locate and directs the locator unit 10 to begin searching, such as by pressing the search input control 44, the control unit switches the display mode to the form shown in FIG. 5 and activates a transmitter 61, which is linked to the control unit 60. The transmitter 61 then sends a modulated RF locator signal that includes the selected digital address code. In one embodiment, the locator signal has a frequency of approximately 926 MHz, although those skilled in the art will realize that higher and/or lower frequencies can also be used.

The locator signal is repetitively transmitted at intervals as long as the search input control 44 is activated. In one embodiment, the locator signal is transmitted continuously while the user is commanding the locator signal to be sent. In one embodiment, the locator may transmit the locator signal automatically at specified times or at specified intervals without the operator activating the search control 44. The control unit 60 monitors the output of a direction finding receiver 62 which is connected to antenna array 65. In one embodiment, a filter 67 may be interposed between the direction finding receiver 62 and the control logic unit 60. In one embodiment, the filter 67 may be a band pass filter. In one embodiment, the locator unit 10 includes a switch 66 which controls the connection between the antenna array 65 and the transmitter 61. The switch 66 may be integral with, or coupled to a diplexer. The switch 66 can also control the connection between the antenna array 65 and the receiver 62.

Figure 7A:
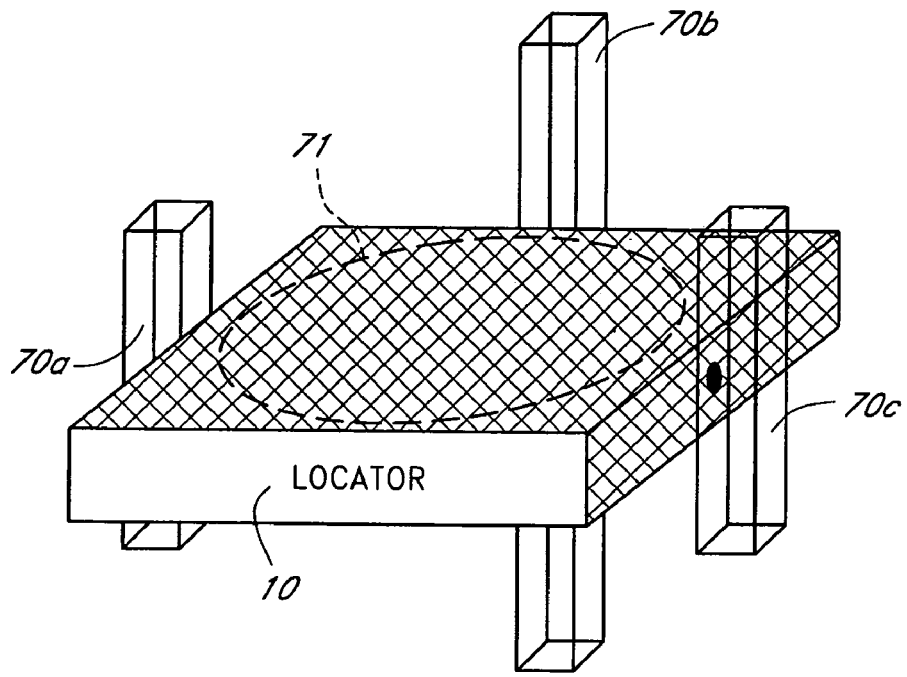
FIGS. 7A and 7B are a view of the antenna array of one embodiment of the present invention.
Figure 7B:
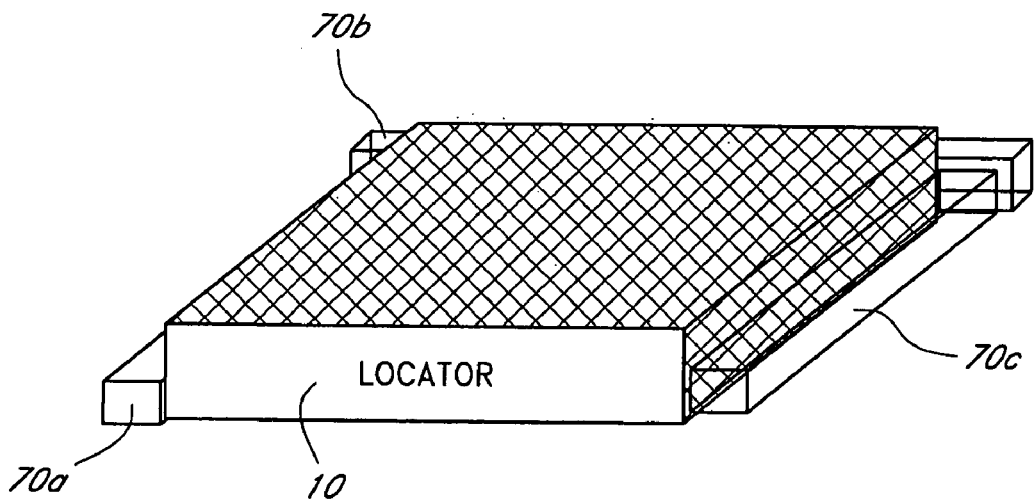

In one embodiment, the antenna array has one or more antennas. In one embodiment, the antenna array 65 has 3 or more omni-directional antennas equally spaced around a circular path. The antennas can also be used for transmitting locator signals and command signals to the transceivers 11 and receiving digital response data back from the transceivers 11. In one embodiment, the antennas can also be sued for receiving continuous wave signals or tone modulated signals back from the transceivers 11. In one embodiment, each of the antennas can be independently switched to the RF receiver or the RF transmitter within the locator unit 10. One embodiment of the antenna array 65 is shown in FIGS. 7A and 7B. In this embodiment, the antenna array includes at least three antennas 70*a*, 70*b*, 70*c* located along a circular path 71. Each antenna 70*a*, 70*b*, 70*c* is pivotally mounted to the locator unit 10. FIG. 7A shows the antennas 70*a*, 70*b*, 70*c* extended and in the operative position. When the user is finished using the locator unit 10, he can then move the antennas 70*a*, 70*b*, 70*c* to the stored position, shown in FIG. 7B. Because the antennas are pivotally connected to the locator unit 10, the user can rotate the antennas such that they are parallel to the edges of the locator unit 10 as shown in FIG. 7B. This configuration allows the locator unit 10 to be conveniently stored, such as in the pocket of the user. Additionally, it prevents the antennas 70*a*, 70*b*, 70*c* from being damaged when not in use. The antennas can be, for example, dipole antennas, patch antennas, slot antennas, or printed circuit antennas. Those skilled in the art will realize that many other antennas can also be used.

In the present invention, as is also true in other tracking systems using RF signals, the RF communications between the locator unit 10 and the transceivers 11 are subject to the effects of path fading in both directions. To mitigate these effects, one embodiment of the present invention uses a method to detect and reduce the fading losses for both the transmissions from the locator unit 10 to the transceiver 11 and the reception of the response from the transceiver 11 to the locator unit 10.

During the polling process, where the locator unit 10 is attempting to establish communication with a selected transceiver 11, the control unit 60 in the locator unit 10 attempts to establish communications using one of the antennas in the antenna array 65. If that attempt is unsuccessful, the control unit 60 will select a different antenna in the antenna array 65 and repeat the polling sequence. The locator unit 10 will repeat this process selecting each antenna in turn until a response is received or the user terminates the polling operation. Because the individual antennas 70*a*, 70*b*, 70*c* in the array 65 are on the circumference of the circle 71 which, in one embodiment, is approximately less than ⅓ wavelengths in diameter, at least one of the antennas will be in a favorable RF path position at all times.

In this embodiment, when receiving the RF signal response from the transceiver 11, the locator unit 10 rapidly switches through the antenna array 65 in a circular fashion, sampling the received signal at each antenna preferably for approximately 1 msec before advancing to the next antenna in the array 65. During the sampling interval, the relative phase of the received signal is measured to determine the bearing of the selected transceiver 11 with respect to the locator unit 10. Also during each sampling interval, the control unit 60 reads the output of the wide dynamic range received signal strength (RSSI) circuitry that is within the RF receiver 62, and stores the results for each antenna in the array 65. Just before the transceiver's 11 preprogrammed switch from transmitting unmodulated carrier to transmission of the ranging tone and response data, the control unit 60 in the locator unit 10 selects the antenna having the most favorable RF path to the transceiver 11 and switches that antenna to the receiver 62. This ensures the use of the antenna having the least RF fading and provides the highest signal level to the locator unit's 10 RF receiver 62.

As previously described, when a transceiver 11 receives a locator signal that contains an address code matching the address code stored in the transceiver 11, the transceiver 11 sends a response signal. The control unit 60 analyzes the response signal from the transceiver 11 at each of the receiving antennas 65 to determine the angle of arrival of the signal at the locator device 10. From this information, the control unit 60 determines the distance and relative direction of the transceiver 11. Those skilled in the art will realize that many standard techniques can be used to determine the relative direction of the transceiver 11 from the locator unit 10. For instance, the Doppler principle for measuring the bearing of an RF transmission can be used, as taught by U.S. Pat. No. 4,041,496 issued to Norris, which is herein incorporated by reference in its entirety. Other improved methods for determining the distance and relative direction of the transceiver 11 are also discussed herein.

In one embodiment, the locator unit 10 also has a timer 63 that is operable to measure the time interval between the transmission of a control signal and the receipt of a response signal by the receiver 62. This time interval between the transmission of a control signal and the receipt of a response signal is equal to the sum of the propagation delay through the transceiver 11 and locator unit 10, also referred to herein as the system delay, plus the propagation time of the RF signal from the locator device 10 to the selected transceiver 11 device and back. The measured time interval is read from the timer 63 by the control unit 60, converted to an equivalent distance by subtracting out the system delay, dividing the result by 2 and displaying the calculated range on the display screen 46.

A standard system delay for the transceiver 11 and locator unit 10 can be entered into the locator unit 10 for use in calculating the range in the manner previously described. However, in practice, the propagation delay of the control signal through an individual transceiver 11 will vary from device to device. Any such variation in the response time of the transceiver 11 will result in an error in the calculation of the distance from the locator unit 10 to the selected transceiver 11. To minimize this error, in one embodiment the control unit 60 is further operable to calibrate the propagation delay though a selected transceiver 11 and locator unit 10. It should be noted that the delays in the locator unit 10 are often no more constant that the delays in various transceivers 11, and therefore in one embodiment the calibration function calibrates all the variances.

To perform the calibration, the user places a transceiver 11 that he or she wishes to calibrate a known distance from the locator unit 10, and inputs the distance between the locator unit 10 and the transceiver 11 into the locator unit 10. The user then activates the calibration mode. Once this mode is activated, a locator signal containing the address code of the selected transceiver 11 is sent by the locator unit 10. As previously described, the transceiver 11 will receive this signal and send a return signal which will be received by the locator unit 10. The control unit 60 reads the data from the timer 63 to determine the time elapsed from when the search signal was sent to when the return signal was received. Because the distance between the locator unit 10 and the transceiver 11 is known, the expected time it should take for a signal to travel to and back from the transceiver 11 (assuming a transceiver 11 and locator unit10 propagation delay of zero) can be calculated. The expected time can then be subtracted from the time actually measured to yield the propagation delay for the selected transceiver 11 and locator unit 10. This measured system delay time is then stored in the memory of the control unit 60 and associated with the particular transceiver 11.

When subsequent searches are performed for this transceiver 11, the control unit 60 will recall the stored system delay time associated with that transceiver 11 and use it when calculating the distance between the locator unit 10 and the transceiver 11, thereby reducing error in the distance calculation due to delay time variations of the individual transceivers 11 or variations in the delay time of the individual locator unit 10. If the selected address code does not have a measured delay time stored in the memory, a factory-stored, average delay time will be used in the distance calculation for that device.

Referring again to FIG. 6, in one embodiment the locator unit 10 also includes a conflict detection receiver 64 for detecting the presence of transmissions from a second locator unit operating within the RF reception range of the first locator unit. In this embodiment, when the user has initiated a search, the control unit 60 samples the output of the conflict detection receiver 64 prior to activating the transmitter 61. If a transmission from a second locator device is detected, the control unit 60 will delay activating the transmitter 61 such time as the RF channel is free from interference, i.e. until the second locator unit is no longer transmitting a search signal. In one embodiment, the conflict detection receiver 64 can be the same unit as the direction finding receiver 62. In another embodiment, a transceiver 11 can be placed in the locator unit 10. The transceiver 11 can be used to detect any search signals being sent by other locator units 10. This embodiment is further advantageous because it would allow another locator unit 10 to search for the embedded transceiver 11 and thereby find the locator unit 10.

If two locators within RF signal range of each other are activated at the same time, the interfering signal will be detected and both locator devices will cease transmissions for a randomly selected time interval whereupon transmission will be attempted again. These techniques are well known to those skilled in the art as Carrier Sense, Multiple Access/Collision Detect or CSMA/CD. The application of these techniques to RF transmitters sharing a common communication channel is taught by Patterson in U.S. Pat. No. 4,013,959, which is incorporated herein by reference in its entirety. Using the method described above, any number of locator devices 10 and transceivers 11 of the present invention can be used simultaneously in the same general area without interference thereby overcoming a major limitation found in the prior art.

Additionally, in one embodiment, this situation is further addressed by only activating the receiver 62 for a limited period of time after each locator signal is sent. This helps to minimize the possibility that a return signal from a different transceiver 11 other than the particular one being searched for will be received by the locator unit 10. When the search function is activated in a locator unit 10, the transmitter 61 begins sending the selected transceiver 11 address at a standard repetition rate such as, for example, 10 interrogations per second. Each time the locator unit 10 transmits the transceiver 11 address code, a "gate" is opened in the locator's receiver 62 to receive the response. The locator unit 10 is only receptive to transceiver 11 transmissions during the time the receiver is gated "on," that is to say, the locator unit 10 is only receptive to transceiver 11 transmissions during the time the receiver 62 is activated. After the transmission interval, the process is repeated again until the user releases the search button 44.

Specifically, if a locator signal is sent by the locator unit 10 at time $t_0$, the receiver 62 is turned on at time $t_1$, the minimum time it would take for a response from a transceiver 11 to be received by the locator unit 10 after a locator signal was sent at time $t_0$. The receiver 62 is then turned off at time $t_2$, the maximum time it would take for a response from a transceiver 11 to be received by the locator unit 10 once a locator signal has been sent at time $t_0$.

The control unit can also have other advantageous features in addition to those previously discussed. For instance, in one embodiment the control unit can display to the user an electronic compass that is constantly updated. This aids the user in locating an object for which he is searching. To conserve power in the transceiver 11 and to keep the RF channel free for use by other locator units 10 in the area, it is preferable to poll transceivers 11 for range and position information as infrequently as possible. For example, if a range and bearing has been established from the locator unit 10 to the transceiver 11 and the range indication is several hundred feet, it is unnecessary to poll the transceiver's 11 position again until the user has time to move closer to the transceiver's 11 location.

However, it is seldom possible for the user to move in a straight-line path from his present location to the location of the transceiver 11. Commonly there are objects in the path that must be circumvented or the user is forced to follow a trail or sidewalk that takes them off of the straight-line path. In these cases the user will invariably change the orientation of the locator unit 10 as they negotiate the best path to the transceiver 11. This reorientation or rotation of the locator unit 10 may cause a static bearing display to indicate erroneous bearings to the transceiver's 11 location and may be confusing to the user.

To overcome this problem, without resorting to a high polling rate that would compromise other important system goals, an electronic compass can be incorporated into the locator unit 10. The electronic compass displays the relative bearing to the selected transceiver 11 as an absolute magnetic bearing. Each time the transceiver's 11 location is polled by the locator unit 10, the output of the internal compass is also read. In this way the relative bearing of the transceiver 11 can be converted to an absolute compass heading from the user's present position.

As the user negotiates the best path to the transceiver's 11 location, the display is updated continuously from the locator unit's internal compass, thus giving the appearance that the transceiver's 11 bearing is being continuously updated as the locator unit 10 is rotated. It will be noted that as the user moves, in one embodiment of the present invention the bearing to the object indicated by the compass heading will become slightly incorrect.

For example, if after a polling the transceiver 11 and receiving a response, it is determined that the transceiver is in a direction due north of the user, the compass heading will read north. If the user moves to the east, the transceiver 11 will now be located north-west of the user. However, the compass heading will be continually updated to continue to display a northern direction. Thus, the compass heading will not be pointing to the exact location of the transceiver. This is not problematic because the compass heading will be updated to display an accurate directional bearing at the next polling cycle. In the present example, after the next polling event, the compass heading will be updated to show the transceiver is located in a north-west direction. Because the user will move only a limited distance between polling events, the compass will only display a slightly incorrect bearing for a relatively small duration of time as the user moves. Advantageously, the compass will point the user in the general direction of the transceiver. Additionally, the compass will give the appearance to the user that the direction to the transceiver is being continuously updated between polling cycles.

As previously mentioned, periodically, or at the discretion of the operator, the transceiver's 11 range and bearing with respect to the locator unit 10 is re-measured providing fresh data for the range and bearing display and compensating for any movement of the locator unit 10 or transceiver 11 with respect to one another. The relative bearing to the selected transceiver 11 can be displayed by the directional display element 54 of FIG. 5.

In one embodiment, the locator unit 10 is further operable to communicate with other locator units. This has a number of advantages. For instance, if a first locator unit searches for and is unable to locate a particular transceiver 11 because of unreliable readings or because the transceiver 11 is out of the search range, the locator unit can communicate with other locator units and direct them to also search for the transceiver 11. If one of these locator units finds the transceiver 11, the location of the transceiver 11 can be sent to the first locator unit. This capability may be useful, for example, in a warehouse setting in which dozens of locator units and thousands of transceivers 11 are being used.

Figure 8:
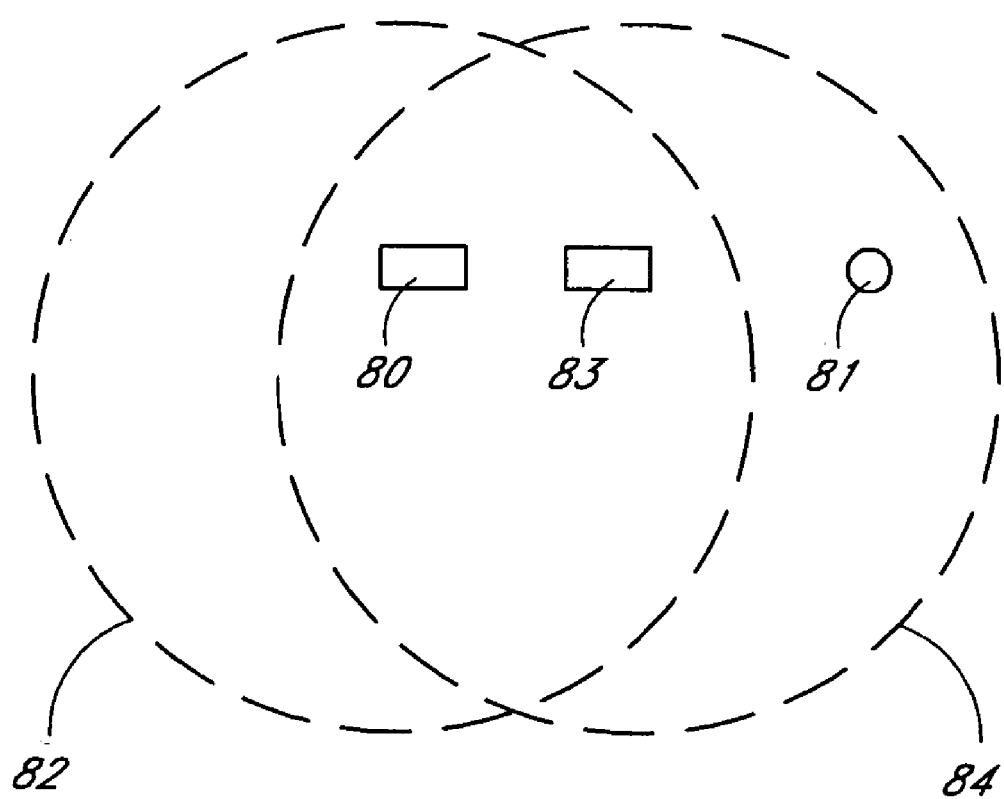
FIG. 8 is a depiction of two locator units communicating to locate a transceiver.

As shown in FIG. 8, a first locator unit 80 is attempting to locate a transceiver 81. However, the transceiver 81 is located outside a search rage 82 of the first locator unit 80. The first locator unit 80 can then send a wireless signal to a second locator unit 83, and request that it conduct a search for the transceiver 81. Because the transceiver 81 is within a search range 84 of the second locator unit 83, it can determine the range and bearing of the transceiver 81.

In order to determine the range and bearing from the first locator unit 80 to the transceiver 81, it is useful for the first locator unit 80 and second locator unit 83 to determine their range and bearing with respect to each other or with respect to a common point. This can be accomplished, for example, by constructing the locator units such that each locator unit functionally possesses the transceiver 11 of the kind previously described. Assuming the first and second locator units 80, 83 are within search range of each other, the first locator unit 80 can conduct a search for the transceiver contained in the second locator unit 83, and thereby determine the range and bearing to the second locator unit 83. Once the first locator unit 80 has obtained the range and bearing from it to the second locator unit 83, and received from the second locator unit 83 the range and bearing of the transceiver 81 from the second locator unit 83, the first locator unit 80 can determine the range and bearing of the transceiver 81 from itself.

Alternatively, the first and second locator 80, 83 could determine their location relative to a common point. This can be accomplished, for example, by each locator determining its range and bearing relative to a transceiver 11 that has been placed at a known location.

Locator units 10 can communicate with each other via several methods. In one embodiment, the locator unit 10 can transmit information to another locator unit using the same transmitter 61 it uses to send a locator signal when searching for a transceiver 11, and can receive information using the same receiver 62 it uses to receive signals from a transceiver 11. If it is necessary for two or more locator units located an extended distance apart to communicate, each locator unit can be connected to its own wireless modem. For example, the each locator unit 10 can be connected to a Palm Pilot® or other personal data assistant device that has an attached wireless modem. Furthermore, multiple locator units 10 can be connected through other communication paths. The term "communication path" is intended to include communication medium such as wireless, Ethernet, the internet, and the like. If one locator unit 10 connected to the communication path locates the desired transceiver 11, it may communicate to the locator unit 10 that initiated the search for the transceiver 11 that the transceiver 11 has been located. This will assist the user in locating the transceiver 11.

In one embodiment, to ensure that security between locator units is obtained, and to prevent the locator unit 10 from responding to a request from an unauthorized locator unit to perform a search, locator units can be identified by group. In this embodiment, the locator unit only responds to search requests from other locator units in its same groups. This allows a user or supervisor to maintain policies and permissions on a group-wide level.

Multiple transceivers 11 can be tracked in a quick and efficient manner. The user can use the tracking information to determine the location of each transceiver 11 with respect to the user's location, or the locator unit 10 can automatically compare the measured location with parameters set by the user. For instance, the user can enter a specified distance into the locator unit 10, and if any of the transceivers 11 selected by the user to be tracked move further than this specified distance from the user, the locator unit 10 will alert the user. This may be desirable, for instance, when a teacher desires to track the students during a field trip.

While it is possible for a locator unit 10 to track a group of transceivers 11 by polling each transceiver 11 in a "round robin" fashion, this method may be undesirably slow for more than just a few transceivers 11 in a group. It may take an undesirable amount of time to poll multiple transceivers 11 in the manner previously described because a transceiver address must be transmitted to each transceiver 11, and the locator unit 10 must repetitively transmit the transceiver address until the selected transceiver 11 activates its receiver 30. As a result, it may require several seconds for each transceiver 11 to be tracked. To facilitate the efficient tracking of groups of transceivers 11 by one or more locator units 10, one embodiment of the present invention allows communications between the locator unit 10 and each transceiver 11 to be streamlined.

As previously discussed, the transceiver 11 preferably contains a real-time clock that allows the transceiver 11 to be activated at times specified by the user. Additionally, as previously discussed, in one embodiment a temporary session ID can also be stored in the transceiver 11. In one embodiment, the locator unit 10 also includes a real-time clock function at the application software level and has the ability to set the real time clock of individual transceivers 11 over the RF link. The application-level software of the locator unit 10 also preferably includes a database capable of storing and retrieving data pertaining to the total population of transceivers 11 associated with the individual locator unit 10.

These capabilities can be used to efficiently track a group of transceivers 11 in the following way. The user first identifies the group of transceivers 11 to be tracked by selecting them from the database using any of the search and sort capabilities provided. The user can save a selected group of transceivers 11 and assign a name to the group for later recall. The user can then select alarm conditions which can be compared against the location of each transceiver 11 in the group. For instance, alarm conditions can include: no response received from transceiver 11, transceiver 11 beyond a specified range, transceiver 11 outside specified range of bearings, change in location (movement) beyond a specified amount, low battery condition of transceiver 11, or activation of an external switch (i.e. a panic button.). Alarm conditions can be the same or different for each transceiver 11 in the group.

Once the group-tracking mode is activated in the locator unit 10, the selected transceivers 11 will be automatically assigned a session ID code for this group tracking session. The session ID code is a combination of a unique session identifier and a unique locator unit code such that multiple locator units 10 tracking groups of transceivers 11 within range of each other will assign unique session ID's to the transceivers 11 in their respective groups. Each transceiver 11 in the group will also have its real time clock set to match the one in the locator unit 10. The locator unit 10 can then assign successive wakeup times to each transceiver 11 in the group such that each transceiver 11 in the group will activate its receiver in turn to be polled by the locator unit 10.

Using this method, the locator unit 10 can efficiently communicate with a group of transceivers 11 at predetermined intervals and collect range, bearing and other data from each transceiver 11 to display to the user and/or compare to specified alarm parameters. For example, a group of 30 transceivers 11 can be polled at one minute intervals and compared to the specified alarm conditions of no response or greater than 100 feet distance from the locator unit 10. By contrast, a group of transceivers 11 which are activating their receivers at unsynchronized 5 second intervals could take as long as 2½ minutes to poll with each transceiver 11 in the group waking up 12 times as often and consuming proportionately more power from the internal battery. An added advantage is that each transceiver's receive cycle is significantly shortened by the use of the abbreviated session ID, reducing power consumption and reducing the likelihood of a data transmission error causing a missed response or an erroneous response from a transceiver 11.

If a transceiver 11 violates a specified alarm condition the system software will notify the locator unit 10 user. If desired, the user can initiate a search for the transceiver 11 by programming the transceiver's wakeup interval to a shorter duration and activating the locator unit's search mode. In one embodiment, the locator unit 10 may also send a command to the transceiver 11 to cause the activation of its signaling device thereby alerting the wearer of the transceiver 11 or others close by that the transceiver 11 has violated a specified alarm condition.

As discussed, in one embodiment the locator unit 10 can instruct the transceiver 11 to turn on at specified times. By avoiding unnecessary wake up cycles in the transceiver 11, and instead instructing the transceiver 11 to turn on at specified times, the transceiver 11 can communicate more often and at the same total power consumption level. For example, a transceiver 11 that wakes up once every ten seconds but only transmits infrequently uses about the same amount of power as a transceiver 11 that wakes up once every two minutes but transmits each time it wakes up.

Finally, as the previous discussion indicates, in one embodiment the locator unit 10 is operable to send various commands to the transceiver 11, and the transceiver 11 is operable to send various responses back to the locator unit 10. A listing of some of the commands are included in Table 2.

TABLE 2

| Command Function | Data | Response |
| --- | --- | --- |
| Locate Transceiver | Tag ID, SAT Tone | Unmodulated Carrier, Tone Loop Back |
| Set Buzzer On/Off | Duration (1–255) Seconds, 0 = Off | Ack/Nak |
| Set Wakeup Interval | 1 to 65,535 seconds | Ack/Nak |
| Set Wakeup Date | YY:MM:DD 3-byte packed BCD | Ack/Nak |
| Set Wakeup Time | HH:MM:SS 3-byte packed BCD | |
| Set Wakeup Duration (Time to wait for data) | 1–255 msec, 0 = Auto (As fast as possible) | Ack/Nak |
| Set Tag Secondary ID (In addition to factory address) | 16 to 28 bits, 0 clears secondary ID | Ack/Nak |
| Set Session ID (In addition to factory and secondary addresses) | 8 bits, 0 clears session ID | Ack/Nak |
| Set Session ID Expiration | HH:MM:SS, 0 = Active until cleared | Ack/Nak |
| Set Date | YY:MM:DD 3-byte packed BCD | Ack/Nak |
| Set Time | HH:MM:SS 3-byte packed BCD | Ack/Nak |
| Read Battery Status | None | Good/Bad/Nak |
| Read External Data, Port # | Input Port # (0–3) | Data/Nak |
| Write External Data, Port # | Output Data, Port # (0–3) | Ack/Nak |
| Set Transceiver Frequency Channel | Channel # (0–255) | Ack/Nak |
| Tune Transceiver Receiver Frequency | Value, 0–31 | Ack/Nak |
| Tune Transceiver Transmit Frequency | Value, 0–31 | Ack/Nak |
| Set Transceiver | 1–255 msec, 0 = On | Ack/Nak |

TABLE 2-continued

| Command Function | Data | Response |
| --- | --- | --- |
| Unmodulated Response Duration | Until Canceled | |
| Set Transceiver Tone Loop Through Response Duration | 1–255 msec, 0 = On Until Canceled | Ack/Nak |
| Cancel Transceiver Response | None | None |
| Set Transceiver Transmitter Power Level | Level (1–15), 0 = OFF | Ack/Nak |
| Restore defaults | None | Ack/Nak |

In Table 2, "Ack" stands for acknowledge, and "Nak" stands for not acknowledge. In one embodiment, the "locate transceiver" command is the command followed when the locator unit 10 is attempting to find the transceiver 11. The locator unit 10 sends a locator signal containing an address code, and then sends a single audible tone that is FM modulated. The transceiver 11 initially sends an unmodulated carrier signal, and then enters into loop back mode in which it responds with a modulated FM carrier signal.

In one embodiment, the transceiver 11 is operable to emit an audible tone. This will help the user to locate the transceiver 11. For instance, once the user is relatively close to the transceiver 11, the user can direct the transceiver 11 to emit an audible tone to help the user locate the transceiver 11. In another embodiment, if the signal strength of the locator signal or the return signal reaches a certain predetermined level, indicating that the locator unit 10 is relatively close to the transceiver 11, the transceiver 11 can automatically emit an audible tone. This will assist the user in locating the transceiver 11. In another embodiment, the user can instruct the control unit 10 to direct the transceiver 11 to emit an audible tone. This feature is particularly useful when the user knows the transceiver 11 is close by, such as when the user is searching for the transceiver 11 in the room of a house. The user can direct the transceiver 11 to emit an audible tone, thereby allowing the user to quickly locate the transceiver 11. Those skilled in the art will realize that the transceiver 11 may include other indicators than the ability to emit an audible tone, such as the ability to activate a light coupled to the transceiver 11, and the like.

With the "set buzzer on/off" command, the locator unit 10 can instruct the transceiver 11 to emit a tone for a specified duration. In one embodiment, the duration can be from 1–255 seconds, although other time periods may also be used. In one embodiment, the locator unit 10 can also command the transceiver 11 to stop emitting the tone.

As previously discussed, in one embodiment the locator unit 10 can set the time interval between activations of the transceiver 11. The "set wakeup interval" command allows the locator unit 10 to set the time intervals between activations of the transceiver 11 to be from 1 to 65,535 seconds later, although other time durations may also be used.

In one embodiment, the locator unit 10 may also set the time at which the transceiver 11 will activate. The "set wakeup date" command allows the locator unit 10 to instruct the transceiver 11 to activate on a certain date. The "set wakeup time" command allows the locator unit 10 to instruct the transceiver 11 to activate at a certain time. In one embodiment, the wakeup date and time can each be sent as a 3-byte packed BCD, although other means may be used as well.

In one embodiment, the locator unit 10 can direct the transceiver 11 to stay activated for a specified duration, and wait for a locator signal or other data to be sent from the locator unit 10. The "set wakeup duration" command allows the locator unit 10 to instruct the transceiver 11 to remain activated for a specified duration. In one embodiment, this duration can be between 1–255 msec, or the transceiver 11 can be set to remain activated for as little time as possible. Other durations may also be used.

In one embodiment, the transceiver 11 may be programmed to store a secondary address code. The secondary address code allows the user to supplement the primary address code assigned to the transceiver 11 (such as a factory assigned address code) with an address code that is more meaningful to the user, like an inventory control number or serial number. The transceiver 11 will respond to both the primary and secondary address codes. The secondary address code can be shorter than the primary stored address code, thereby expediting the rate at which multiple transceivers 11 can be polled. The "set transceiver secondary ID" command allows the locator unit 10 to direct the transceiver 11 to store a secondary address code. In one embodiment, the address codes can be between 16 and 28 bits, although other lengths may also be used. The locator unit 10 can also command the transceiver 11 to erase a stored secondary address code.

In one embodiment, the locator unit 10 can also send the transceiver 11 a session ID. This is useful when a group of transceivers 11 is being tracked during a particular time period, or session. The "set session ID" command allows the locator unit 10 to send the transceiver 11 a session ID that will be stored in the transceiver 11. In one embodiment, the session ID can be 8 bits, although other data lengths may also be used. The locator unit 10 can also direct the transceiver 11 to erase a stored session ID. In one embodiment, the locator unit 10 can direct the transceiver 11 to erase a session ID at a specified time. If the user only wanted to track a group of transceivers 11 for a specified time, the user can use this command to set the time at which the tracking session will automatically terminate. The "set session ID expiration" allows the locator unit 10 to direct the transceiver 11 to erase a session ID at a specified time. The locator unit 10 can also direct the transceiver 11 to retain the session ID until it has been cleared by the user.

As previously stated, in one embodiment, the transceiver 11 includes a real time clock. In one embodiment, this clock can be set by the locator unit 10. The "set date" command allows the locator unit 10 to send the date to the transceiver 11. The "set time" command allows the control unit 10 to send the time to the transceiver 11. The real time clock of the transceiver 11 can then be programmed using this information. In one embodiment, the date and time may each be sent as 3-byte packed BCD, although other data lengths may also be used.

In one embodiment, the transceiver 11 includes a battery. In a further embodiment, the transceiver 11 can check the status of the battery, and send the status to the locator unit 10. The "read battery status" command allows transceiver 11 to send information to the locator unit 10 indicating that its battery level is acceptable, or that the battery power is low.

In one embodiment, the locator unit 10 may be operable to be coupled to an external device, such as a computer. The locator unit 10 can then receive information from the external device, such as transceiver 11 numbers, names, etc. Similarly, in one embodiment the transceiver 11 may also be operable to read and/or write data. The "read external data" command directs the transceiver 11 to receive information at a specified port on the transceiver 11. For example, as previously stated, the transceiver may include a sensor 34. The read external data command may be used to command the transceiver 11 to read information from the sensor 34. In one embodiment, the transceiver 11 may also write data to an external device. The "write external data" command allows the transceiver 11 to write data to the external device through a specified port on the transceiver 11. As previously discussed, the external device can be an indicator 35. In one embodiment, the transceiver 11 has three ports, although those skilled in the art will realize that the transceiver 11 may have more or less ports.

In one embodiment, the locator unit 10 may communicate with the transceiver 11 on various frequency channels. This allows the user to switch to a different channel if interference exists on the current channel that is being used. The "set transceiver frequency channel" allows the control unit 10 to direct the transceiver 11 to receive data on a particular frequency channel. In one embodiment, between 0 and 255 channels may be used, although those skilled in the art will realize that more channels may be used if necessary.

In one embodiment, the locator unit 10 may also tune the receiver frequency of the transceiver 11. This is useful to ensure that the transceiver 11 is properly tuned so that it will receive as strong a signal as possible from the locator unit 10. The "tune transceiver receiver frequency" command allows the locator unit 10 to tune the receiver frequency of the transceiver 11. Similarly, in one embodiment, the "tune transceiver transmit frequency" command allows the locator unit 10 to tune the transmitter frequency of the transceiver 11. In one embodiment, the tuning of the receiver and transmitter may be done between 0 and 31 settings, although other values are possible.

As previously discussed, in one embodiment the transceiver 11 responds with an unmodulated, continuous wave tone once it has received an address code from a locator unit 10 that matches the address code stored in the transceiver 11. In one embodiment, the locator unit 10 can use a "set transceiver unmodulated response duration" to instruct the transceiver 11 to emit the unmodulated tone for a specified period of time. In one embodiment, the duration can be set for between 1 and 255 msec, although other durations may also be used. In a further embodiment, the locator unit 10 can command the transceiver 11 to continue to emit the unmodulated tone until the locator unit 10 instructs it to stop.

In one embodiment, after the transceiver 11 receives an address code that matches the address code stored in the transceiver 11, the transceiver 11 sends an unmodulated carrier signal, and then enters into loop back mode in which it sends a modulated FM signal back to the locator unit 10. The "set transceiver tone loop though response duration" allows the locator unit 10 to direct the transceiver 11 to send the modulated FM signal for a specified duration. In one embodiment, the duration may be between 1 and 255 msec, although other durations may also be used. The locator unit 10 may also direct the transceiver 11 to continue to loop the modulated FM signal until the locator unit directs the transceiver 11 to stop.

In one embodiment, the locator unit 10 can cancel any response that is expected or being received from a transceiver 11. The "cancel transceiver response" command allows the locator unit 10 to cancel a response from a specified transceiver 11.

In one embodiment, the locator unit 10 can set the transmitter 33 power level of the transceiver 11. For example, if the locator unit 10 determines that the transceiver 11 is relatively far away, it can instruct the transceiver 11 to increase its transmitter power so that the locator unit 10 will receive a stronger signal. If the transceiver 11 is relatively close to the locator unit 10, the locator unit 10 can instruct the transceiver 11 to decrease its transmitter power level, thereby reducing the power consumption of the transceiver 11. The locator unit 10 can use the "set transceiver transmitter power level" command to accomplish this. In one embodiment, the transmitter 33 of the transceiver 11 has between 1 and 15 power levels. Those skilled in the art will realize that more power levels may also be created. In a further embodiment, the "set transceiver transmitter power level" command may be used to turn off the transmitter 33 of the transceiver 11.

In one embodiment, the transceiver 11 is provided with certain default settings that are preprogrammed. For instance, the transceiver 11 may be preprogrammed to activate at certain time intervals, and remain active for a specified period of time. If the user changes these settings, the "restore defaults" command can be used to restore the settings in the transceiver 11 to the ones that were originally present before being modified by the user. Similarly, if the user enters certain default values and later changes them, the "restore defaults" commands can be used to restore the values originally entered by the user.

D. Determination of Range and Bearing

The bearing from the locator unit 10 to the transceiver 11 can be determined according to the conventional methods, such as by utilizing well known Doppler techniques. The present invention also contemplates other improved methods for determining the range and bearing of the transceiver 11.

Figure 14:
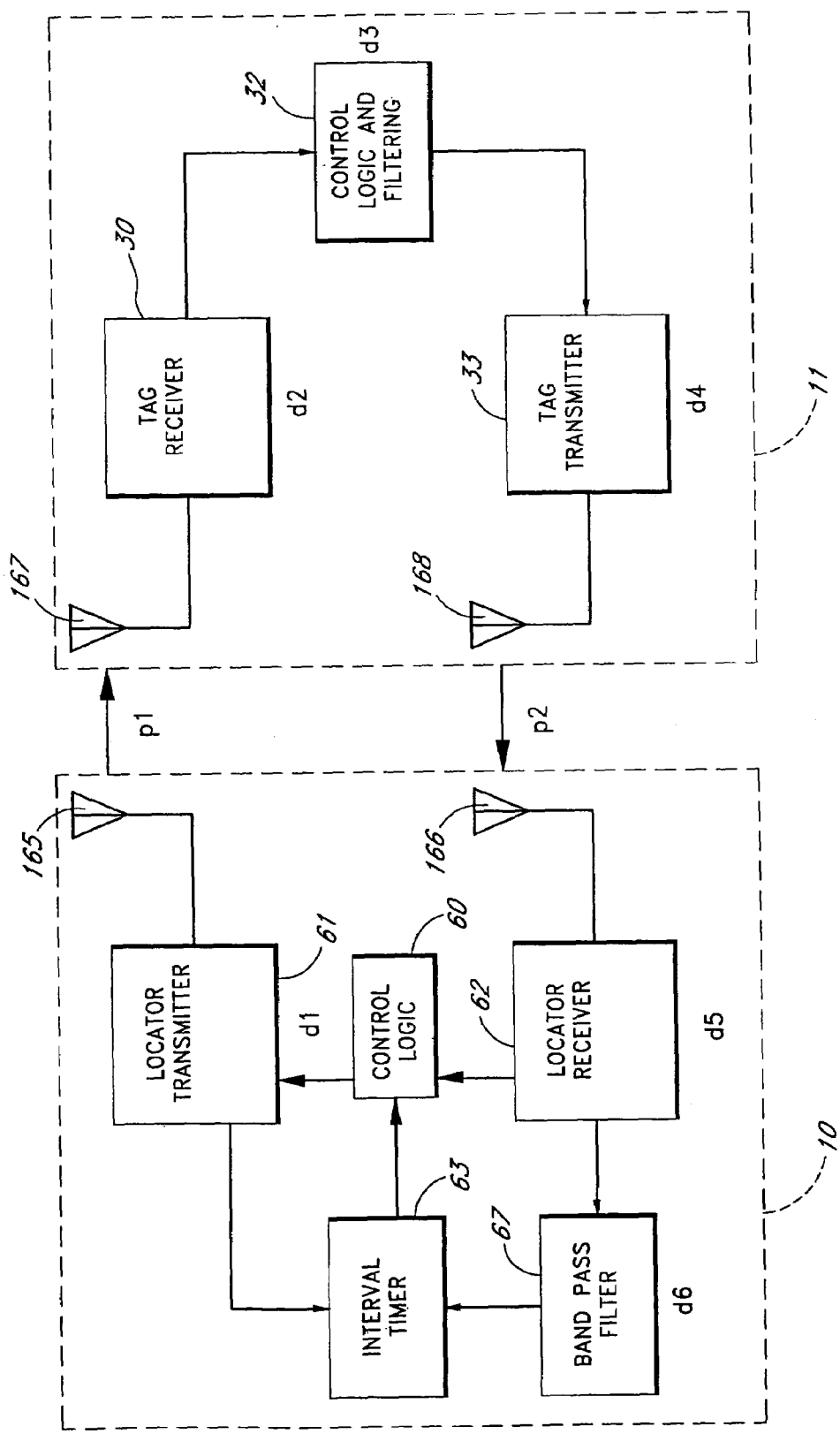
FIG. 14 is a block diagram of the locator and the tag emphasizing elements of that contribute to time delays in the distance measuring function of the locator.
Figure 15:
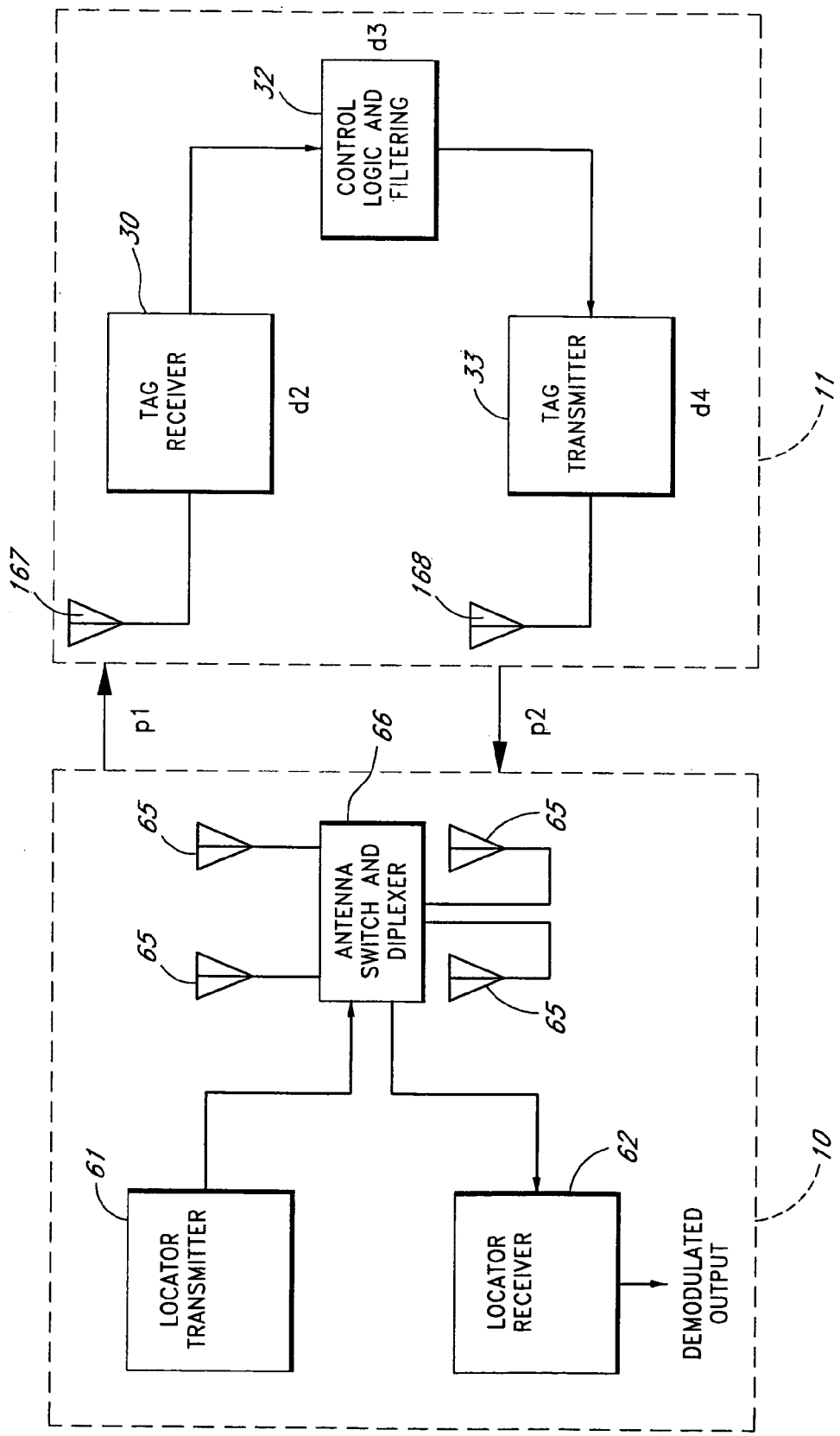
FIG. 15 is a block diagram of the locator and the tag emphasizing elements of that contribute to time delays when an antenna array and diplexer are provided in the locator.

FIG. 14 is a block diagram of the locator 10 and the transceiver 11 emphasizing elements of the locator 10 and the transceiver 11 that contribute to time delays in the distance measuring function of the locator 10. For purposes of explanation, and not by way of limitation, in FIG. 14, the antenna array 65 is represented by a transmit antenna 165 and a receive antenna 166. The control logic 60 instructs the transmitter 61 to send a distance measurement signal to the transceiver 11. A transmitted tone output of the transmitter 61 is provided to a first input of the interval timer 63. An RF output of the transmitter 61 is provided to the transmit antenna 165. The transmitter 61 has a time delay d1. The transmit antenna 165 radiates electromagnetic waves to a receive antenna 167. The path from the antenna 165 to the antenna 167 has a time delay p1. An output of the receive antenna 167 is provided to an input of the receiver 30. The receiver 30 has a time delay d2. An output of the receiver 30 is provided to control logic and filtering module 32. The module 32 has a time delay d3. An output of the module 32 is provided to the transmitter 33. The transmitter 33 has a time delay d4. An output of the transmitter 33 is provided to a transmit antenna 168. The transmit antenna 168 radiates electromagnetic waves to the receive antenna 166. The path from the antenna 168 to the antenna 166 has a time delay p2. An output of the receive antenna 166 is provided to an input of the receiver 62. The receiver 62 has a time delay d5. An output of the receiver 62 is provided to a bandpass filter 67. A received tone output of the bandpass filter 67 is provided to a second input of the interval timer 63.

In one embodiment, the range from the locator 10 to the transceiver 11 is calculated by measuring the time delay for a tone to propagate through the transmitter 61, traverse the distance to the transceiver 11, propagate through the receiver 30, propagate through the module 32, propagate through the transmitter 33, traverse the distance back to the locator 10, propagate through the receiver 62, and propagate through the filter 67. This total time interval is measured by the interval timer 63, which compares the phase of the transmitted tone to the phase of the received tone. In one embodiment, the interval timer 63 begins counting a high-frequency reference clock at a zero crossing of the transmitted tone and stops counting at a zero crossing of the received tone.

The total delay time of the audio tone is:

total_delay=$d1+p1+d2+d3+d4+p2+d5+d6$

The delays (d1–d6), due to signal processing, are relatively constant and do not vary directly with the distance between the locator 10 and the transceiver 11. This signal processing delay is treated as a constant and subtracted from the total measured time delay. The RF time-of-flight, represented by p1 and p2, is directly proportional to the distance the signal must travel though the air. The distance from the locator 10 to the transceiver 11 is then found by the equation:

$$\text{distance} = c\left(\frac{\text{total\_delay} - \text{signal\_processing\_delay}}{2}\right)$$

where c is the speed of light in air.

Unfortunately, the round trip RF time-of-flight is typically relatively small when compared to the typical signal processing time. In one embodiment, the signal processing time is on the order of 250 microseconds. However, the time-of-flight is often less than 10 microseconds. In this situation, the measured quantity is about 4% of the total delay. In a more extreme case, where the distance to the transceiver 11 is 50 feet, the time-of-flight of the RF signal would be 100 nanoseconds or about 0.04% of the total delay. Therefore, a variation in signal processing delay of even 0.1% would be large with respect to the measured fight time. In some situations, variations with time, temperature, frequency offsets and varying signal levels may well introduce significant errors in the distance measurement.

Typically, the most signal processing delay is caused by the filter elements in the locator 10 and the transceiver 11. In one embodiment, the receiver 62 is a triple heterodyne receiver with a relatively large delay resulting from the number of stages and filters in such a receiver (a typical triple heterodyne receiver has four or more filters). In one embodiment, the direct-conversion receiver in the transceiver 11 has only one filter element in the RF path. Thus eliminating the signal processing delays in the locator 10 will reduce the signal processing delays in the distance-measurement loop.

Figure 9:
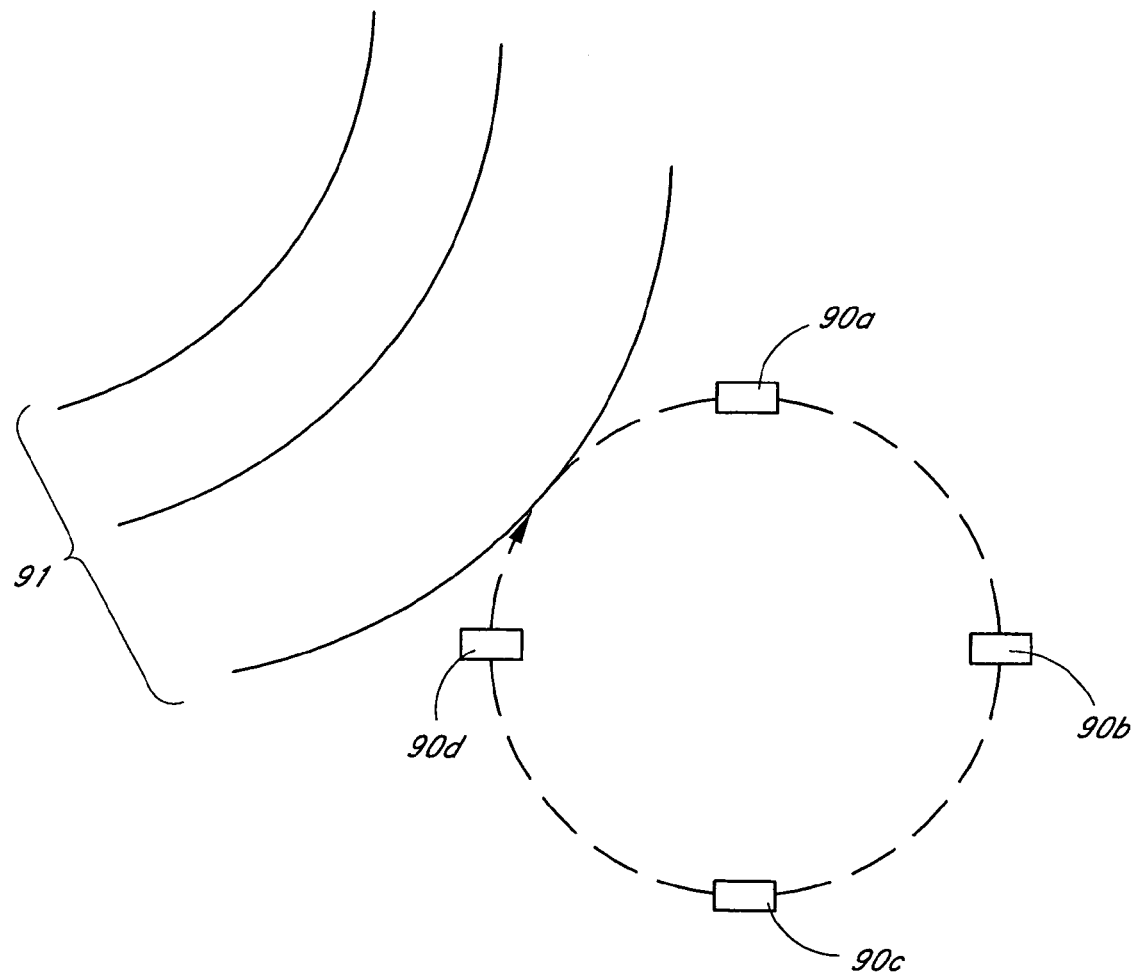
FIG. 9 illustrates an array of antennas used to sample an incoming wavefront at different points in space in a rotating pattern.

In one embodiment, the array 65 is used as a Doppler antenna array to form an RF inferometer to facilitate range measurement. In the case of a Doppler receiver, an array of antennas is used to sample the incoming wavefront at different points in space in a rotating pattern as depicted in FIG. 9.

As the antennas 65 are successively switched to the RF receiver 62 by the switch 66, the phase of the signal will be shifted either positively or negatively depending on the angle of arrival of the incoming wavefront with respect to the array 65. In the example shown in FIG. 9, a switch from antenna 90a to 90b will cause a negative shift in phase while a switch from 90c to 90d will cause a positive shift in phase. Switching from 90d to 90a or from 90b to 90c will have little impact on the phase of the signal. These changes in phase can be detected by a standard FM discriminator in the receiver 62. If an antenna array could be built with an infinite number of antennas, the output of the FM discriminator would be a perfect sine wave with a period equal to the commutation rate (i.e., the switching rate) of the antenna array. This signal is often referred to as the "Doppler Tone".

The same principles apply to a switched antenna array while transmitting. If the antennas are switched one at a time to a RF transmission source, the resulting RF emissions will be modulated in phase by the commutation of the antennas. FIG. 16 is a block diagram of the locator 10 and the transceiver 11 emphasizing elements of the locator 10 and the transceiver 11 that contribute to time delays in the distance measuring function of the locator 10. Unlike FIG. 14, FIG. 16 shows the antenna array 65 and the diplexer switch 66 which controls the connection between the antenna array 65 and the transmitter 61. The diplexer switch 66 also controls the connection between the antenna array 65 and the receiver 62. In one embodiment, the transmitter 61 and the receiver 62 operate at different frequencies, thereby allowing full duplex operation. Since the locator 10 includes the RF diplexer 66, the antenna array can be simultaneously used for transmission and reception in full duplex mode. As shown in FIG. 16, the selected transceiver 11 will receive the transmissions from the locator 10 and retransmit the received modulation at the transceiver transmit frequency.

The transmit modulation created by commutating the antenna array in the locator 10 will be received by the transceiver 11 and retransmitted back to the locator 10, where it will again be modulated by the commutation of the antenna array 65. The two modulation waveforms are summed in the receiver 62 and processed simultaneously through the various stages and filters in the receiver 62. The two modulation signals are substantially identical in frequency, since they are both produced by the commutation of the antenna array, but shifted in phase by the external time delay $p1+d2+d3+d4+p2$. "External time delay" refers to the delay in the system that is external to the locator unit 10. Note that delays in the locator 10 have been eliminated from the time delay calculation, resulting in a desirable reduction of delay due to signal processing and thereby achieving a corresponding reduction in errors due to variations in those processing delays.

Because the RF response from the transceiver 11 is summed in the receiver 62 with the modulation created by the antenna commutation, it is not possible to measure the delay of the signal through the transceiver 11 by timing the interval between the zero crossings of the two signals. Instead, the receiver 62 is used as an RF inferometer wherein the antenna commutation rate is adjusted until the external time delay produces a 180-degree phase shift between the two signals and the maximum cancellation of the commutation-rate frequency is achieved at the output of the receiver 62. In one embodiment, the commutation rate is chosen to produce cancellation of the signals for any commutation rate satisfying the formula:

External_time_delay=$m/2f$ where m is a odd integer (i.e. 1, 3, 5, etc), f is the antenna commutation frequency in Hz, and the external time delay is given by $p1+d2+d3+d4+p2$ (as shown in FIG. 16). For example, when the external time delay is 500 microseconds, receiver output nulls will occur at the commutation rates of 1 KHz, 3 KHz, 5 KHz, etc.

To compute the range to the selected transceiver 11, the signal processing delay though the transceiver 11 must be known. This can be measured by a calibration procedure which involves placing the transceiver 11 at a known distance (i.e. relatively close) from the locator 10 and sweeping the commutation frequency to find the null at the output of the receiver 62. This calibration procedure allows variations in the transceiver signal processing delay due to component variations or other factors. In one embodiment, the transceiver calibration is done for each transceiver 11. The signal processing delay for each transceiver is stored according to the transceiver id.

For example, assume a given transceiver 11 has a signal processing delay of 100 microseconds. If this transceiver 11 is placed relatively close to the locator 10 (e.g. within a few feet) and the commutation frequency is increased until a minimum signal level is observed at the receiver's output, then the first null would be observed at a commutation frequency of 5 KHz. This is the "zero distance" reference frequency for this transceiver 11. If the transceiver 11 is then moved to a position 1000 feet from the locator 10, the total time delay would be 100+p1+p2 microseconds. Assuming an RF propagation velocity of 1 foot per nanosecond, the total flight time (p1+p2) of the signal would equal 2000 nanoseconds or 2 microseconds. Therefore the total delay in this example would be 102 microseconds. This delay would correspond to a first null commutation frequency of approximately 4.902 KHz. This provides a resolution of approximately 10 feet of range for each 1 Hz change in commutation frequency, or 200 ppm frequency deviation per 10 feet of distance change. This resolution is easily achievable with inexpensive components and compares favorably with the cost and complexity of the high-speed time-base and counter used to perform the interval measurement using the previous method.

In one embodiment, given the power constraints dictated by the FCC, a maximum range of operation of approximately one mile is typical. In the example above, this would correspond to a frequency deviation of approximately 480 Hz at the maximum range, or about 10% of the "zero range" commutation frequency. This allows a system design that sweeps the commutation frequency over a relatively small range (e.g. 4.0 KHz to 5.5 KHz) to find the null frequency. This speeds up the range measurement process and reduces false indications that could be caused by detecting secondary nulls in the signal. The lower end of the actual range of frequencies used in the commutation frequency sweep is controlled, at least in part, by the signal processing time delay expected in the transceiver 11. The bandwidth of the range of frequencies used in the commutation frequency sweep is controlled, at least in part by the maximum allowed distance of the locator 10 and transceiver 11.

1. Multipath Detection

As shown in FIG. 9, in the case of a traditional Doppler receiver, an array of antennas 90*a–d*, is used to sample an incoming wavefront 91 at different points in space in a rotating pattern. As the antennas are successively switched to the RF receiver, the phase of the signal will be changed either positively or negatively depending on the approximate angle of arrival of the incoming wavefront with respect to the array. In the example shown in FIG. 9, a switch from antenna 90*a* to antenna 90*b* will cause a negative change in phase while a switch from antenna 90*c* to antenna 90*d* will cause a positive change in phase. Switching from antenna 90*d* to antenna 90*a* or from antenna 90*b* to antenna 90*c* will have little impact on the phase of the signal. These changes in phase can be detected by a standard FM discriminator on a receiver's output. If an antenna array could be built with an infinite number of antennas, the output of the FM discriminator would be a perfect sine wave with a period equal to the commutation rate of the antenna array. This signal is often referred to as the "Doppler Tone" because it is generally in the audio band and may be heard on the output of the radio receiver. The phase of this output sine wave, relative to the start of the antenna commutation cycle (i.e. antenna 90*a*), indicates the angle of arrival of the wavefront. In FIG. 9, the inflection point where the phase change goes from positive to negative is where the arrow on the circle is shown. So in this example, the phase of the receiver output would be advanced approximately 315 degrees from the antenna 90*a* switch point, indicating the angle of arrival of the signal is 45 degrees to the left of antenna 90*a*.

Of course, it is not practical to have an infinite number of antennas in the antenna array. Fortunately, the Nyquist Criterion states that only 2 sample points per cycle are needed to reconstruct a sampled sine wave. In one embodiment of the present invention, a minimum of 3 samples per cycle are used to avoid any 180-degree ambiguity in the determination of the angle of arrival of the signal. To reconstruct the sine wave from the discriminator output, the signal is passed through a relatively narrow band pass filter with a center frequency set to the commutation rate of the antenna array. In one embodiment, a switched capacitor filter is employed. A switched capacitor filter has an adjustable center frequency that is controlled by a clock signal at some multiple of the desired center frequency, for instance 100 times the center frequency. This design allows the center frequency of the filter to be precisely matched because the clock source is derived from the same time base as the control circuitry for the commutation of the antennas. In this way, a very narrow band pass filter can be employed, for instance a 10 Hz pass band, without regard to component accuracies or drift causing the Doppler tone to be outside the center frequency of the filter.

Because RF signals may reflect off nearby objects, it is often the case that an RF receiver will receive signals both directly from the transmitter and from the sources of the RF reflections. Such conditions are commonly referred to as "multipath" and are unavoidable in most typical operational environments. In extreme cases the reflected signals are stronger than the direct path signals because RF absorbing materials such as a hill or a building blocks the direct path from the transmitter to the receiver while the reflected path(s) are relatively free of obstructions. Any of these conditions can cause errors in the measurement of the angle of arrival of the RF signal.

Figure 10:
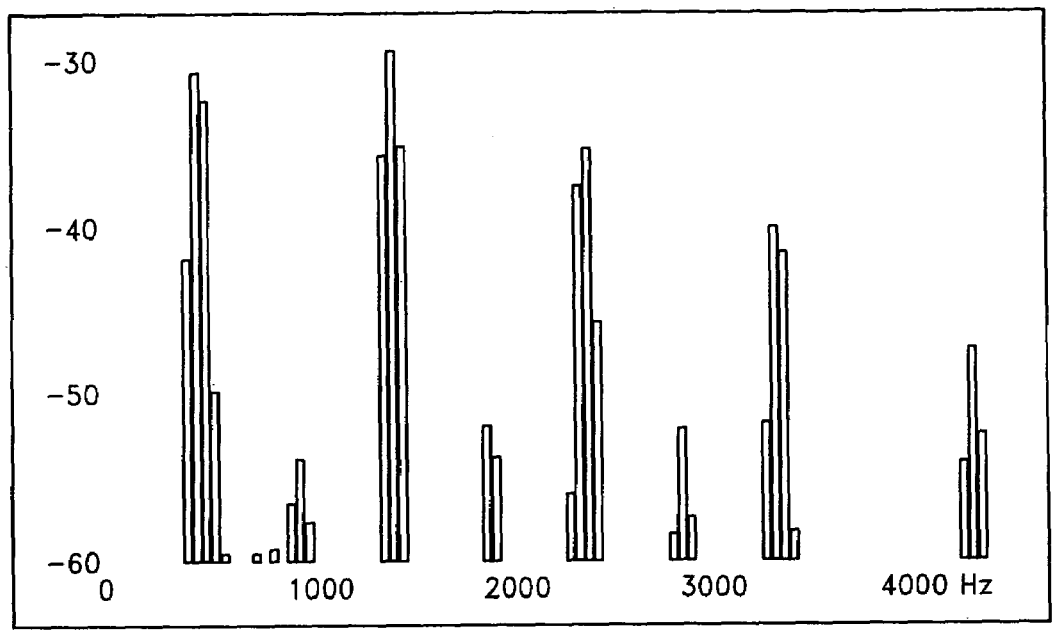
FIG. 10 illustrates the frequency spectrum of a Doppler tone signal when the sources of multipath reflections are absent.

FIG. 10 shows the frequency spectrum of a Doppler tone signal when the sources of multipath reflections are absent. The antenna commutation rate used in this test was approximately 500 Hz. FIG. 10 shows that while the odd harmonics of the commutation frequency are quite strong, the even harmonics are more than 20 dB below the level of the fundamental.

Figure 11:
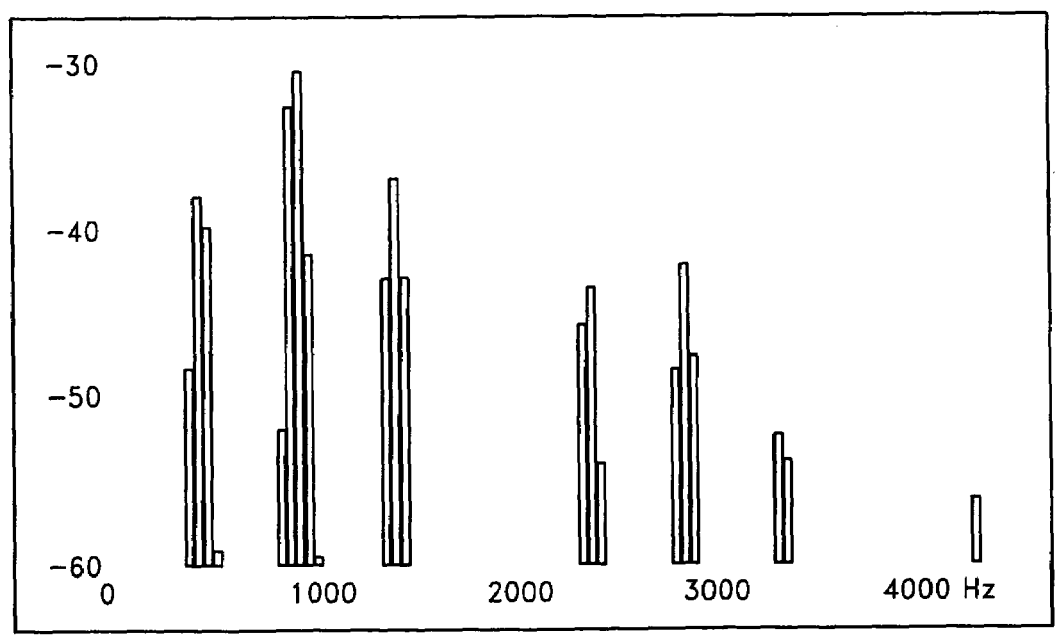
FIG. 11 illustrates the frequency spectrum of a Doppler tone where the receiver was subject to strong multipath interference.

FIG. 11 shows the frequency spectrum of a Doppler tone where the receiver was subject to strong multipath interference. In the presence of multipath interference the second harmonic level is greatly increased and in the example shown in FIG. 11, is approximately 6 dB above the level of the fundamental. Measurement of the second harmonic of the commutation frequency is useful to the determination of an accurate bearing measurement as opposed to a potentially erroneous one. By measuring the effects of multipath the system can ignore potentially confusing data and request the operator to relocate the receiver. For instance, if multipath interference is detected, a message would appear on the display screen 46 of the locator unit 10 requesting that the user move the control unit before another search is performed. In many cases, even small movements of the receiver can produce a large difference in the level of multipath interference, in other cases the source of the interference is moving, as in the case of a passing automobile, and the multipath conditions are changing rapidly with time.

One method of measuring the second harmonic level is to include a second band pass filter, as previously described, tuned to the second harmonic frequency and measure the signal level at the output of the filter. Unfortunately, switched capacitor filters or other types of narrow bandwidth filters are expensive components and adding a second filter for this purpose would have a negative impact on the systems cost and complexity.

Recognizing that the frequency of the Doppler tone is controlled by the commutation of the antenna array, the control electronics can position various frequency components of the tone within the band pass of a single filter. By setting the commutation rate to equal the center frequency of the filter, the fundamental frequency of the Doppler tone can be sampled. To check for the presence of multipath interference, the control electronics may reduce the commutation rate to one half the center frequency of the filter thereby allowing the measurement of the second harmonic level. If desired, the commutation rate can be swept over a range of frequencies as the output of the band pass filter is sampled to measure the complete amplitude versus frequency spectrum of the signal, as depicted in FIGS. 10 and 11. This can be accomplished without employing a digital signal processor using Fast Fourier Transforms (FFT) or other processor intensive techniques to analyze the signal.

2. Difference of Sines Algorithm

When a Doppler technique is used for measuring bearing, a processing element needs to analyze the output of multiple Doppler antennas. For low power applications, the processing element may not have much compute power. It is therefore important to reduce the computational expense associated with determining the bearing for the multiple antenna outputs.

Conventional processing methods involve the following steps. First, for each antenna in the antenna array: 1) switch to the antenna, 2) extract the sine wave from the antenna output using Fourier analysis or Sine wave fit algorithms, and 3) determine the phase offset of the sine wave relative to the antenna switch timing. Second, determine the bearing from the validated mean phase offset. Unfortunately, Fourier analysis and Sine wave fit algorithms are computationally expensive require floating point processing not available in low power applications.

In one embodiment, the control unit uses a difference of sines algorithm and integer math and table lookups to reduce the computational expense of determining the bearing. In this embodiment, the locator unit 10 has an antenna array consisting of four antennas, designated in FIG. 12 as 120$a$, 120$b$, 120$c$, 120$d$, that are located in a square array having sides of length a. The Doppler carrier signal transmitted from the transceiver 11 to the antenna array has a wavelength, W where W/4>a.

Figure 12:
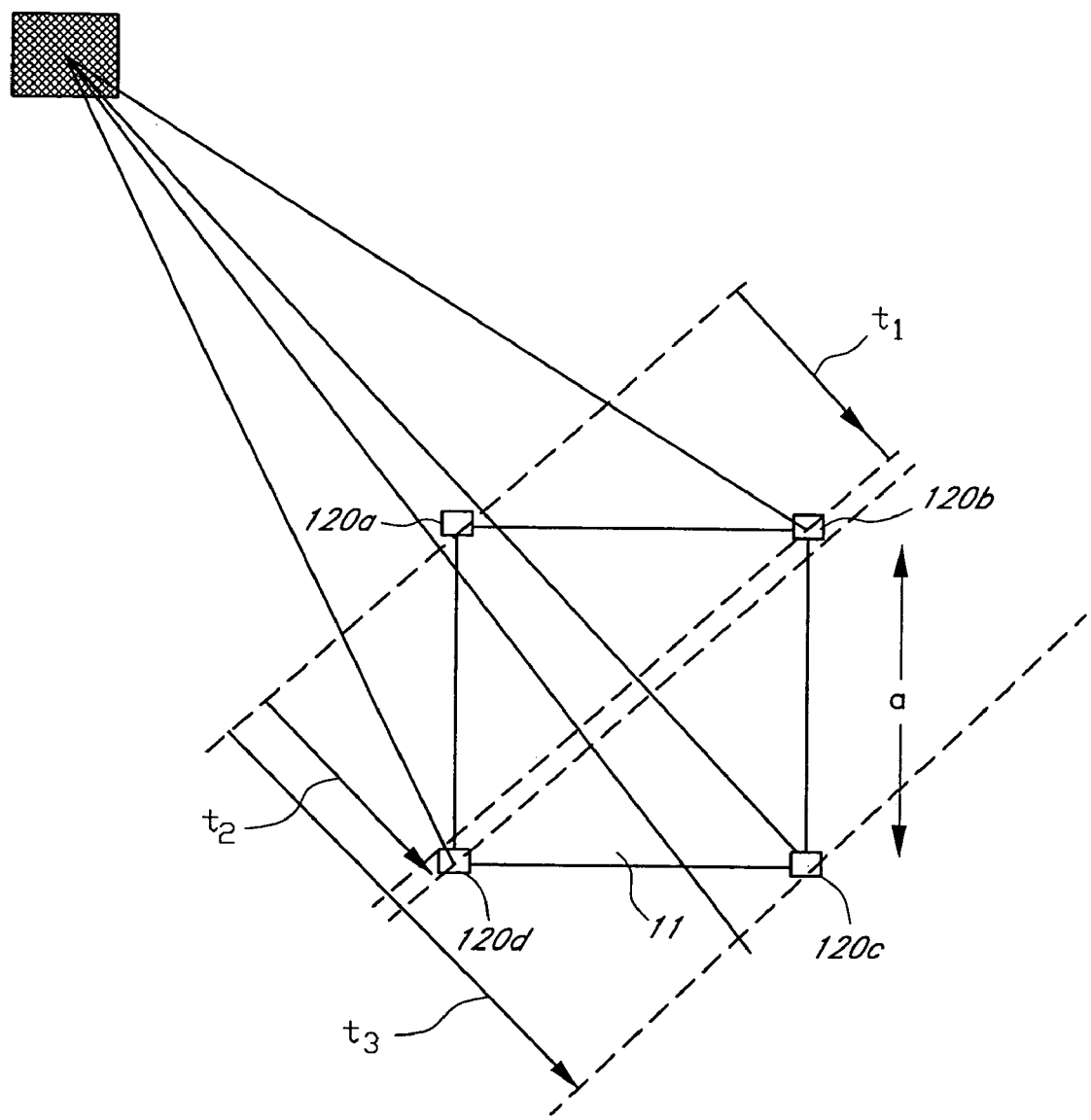
FIG. 12 shows relational features between a transceiver and locator unit that are useful in implementing the difference of sines algorithm.

The bearing of the object relative to each antenna can be determined by knowing the values of $t_1$ and $t_2$, shown in FIG. 12. The antenna closest to the object is determined by detecting a negative going zero-crossing while all the other antennas read positive values. This determines which quadrant in which the transceiver 11 is located. In FIG. 12, the transceiver 11 is in the 270–360 degree quadrant. If $t_1$ is less than $t_2$ then the bearing can be further narrowed to a 45 degree range. The exact bearing can be determined trigonometrically.

Figure 13:
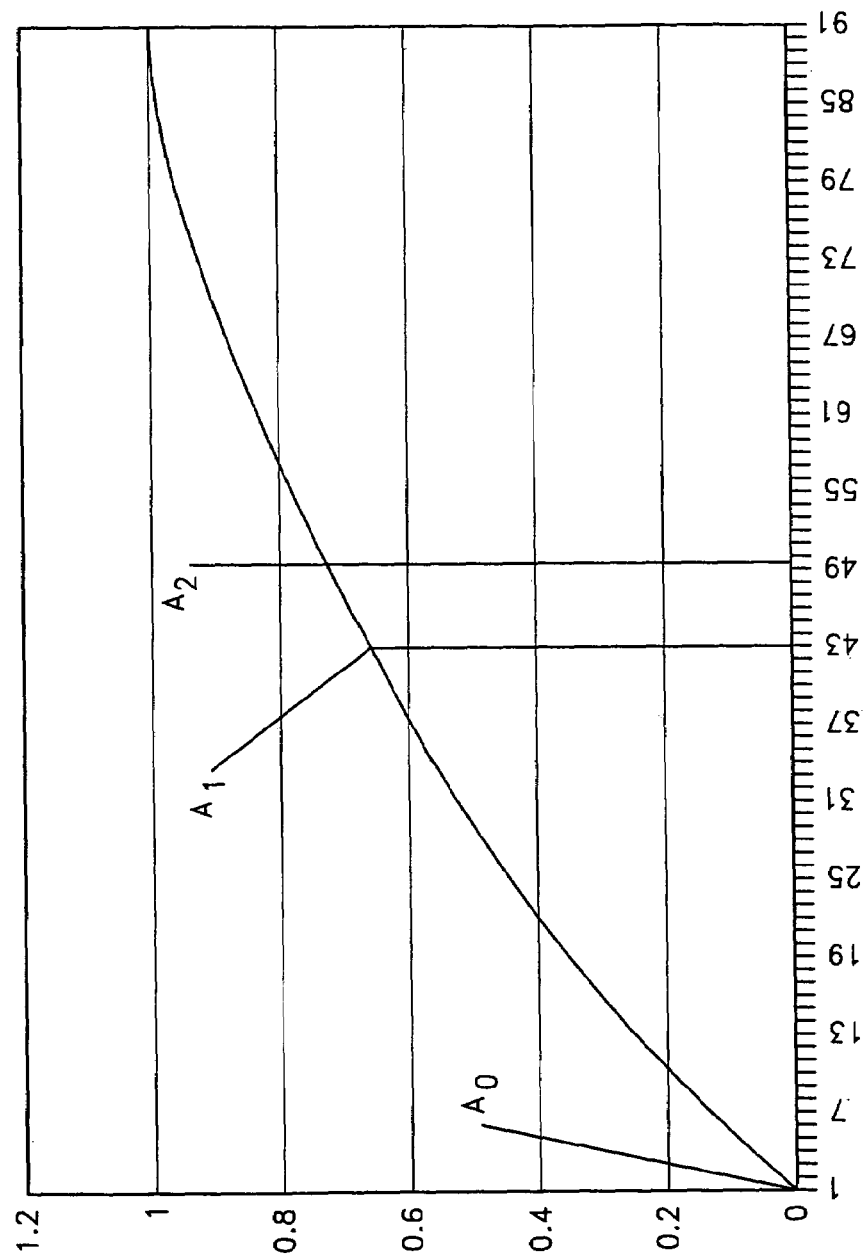
FIG. 13 illustrates the signal levels at zero crossing for a selected antenna, $A_0$.

The values of $t_1$ and $t_2$ can be determined by measuring the phase difference between the signal received at antenna 120$b$ and 120$d$ relative to antenna 120$a$. Specifically, the following formulas can be used:

$$t_1 = T_1 - T_0$$

$$t_2 = T_2 - T_0$$

where $T_0$ is the time of the negative going zero crossing at antenna 120$a$ while antennas 120$b$, 120$c$, and 120$c$ are all positive, $T_1$ is the time of the negative going zero crossing at antenna 120$b$, and $T_2$ is the time of the negative going zero crossing at antenna 120$d$. FIG. 13 illustrates the signal levels at zero crossing of antenna 120$a$. In actuality, $t_1$ cannot be measured absolutely because the wavefront travels across the array in less than a nanosecond. Instead sampling the 2 adjacent antennas 120$b$ and 120$d$ at known intervals later and computing the times of their zero-crossings determine the phase difference. The following formulas can be used:

$$D1 = c \cdot t_1$$

$$D2 = c \cdot t_2$$

$$D1 = a \cdot \sin(\theta_1)$$

$$D2 = a \cdot \cos(\theta_2)$$

where c is the speed of light.

For objects far away $\theta_1$ and $\theta_2$ are almost equal. The bearing can be determined according to the following formula:

$$\mathrm{ARCSIN}(t_1 \cdot c/a).$$

A search of a sine lookup table can compute this. It yields angle 0–90 degrees within the quadrant. Preferably, the sine lookup table could have 90 locations.

For closer objects, the following relation is true:

$$\theta = (\theta_1 + \theta_2)/2$$

The same table can be used for cosine if the resultant offset is subtracted from 90, wherein:

$$\theta = 45 + (\mathrm{ARCSIN}(t_1 \cdot c/a) - \mathrm{ARCSIN}(t_2 \cdot c/a))/2.$$

Therefore, the algorithm preferably has the following steps. First, for each antenna, determine the time, $T_n$, negative going zero crossing. Second, locate the nearest antenna 120$a$, 120$b$, 120$c$, 120$d$ with the earliest negative going zero crossing. Third, compute $t_1 = T_1 - T_0$. Fourth, compute, $t_2 = T_1 - T_0$. Fifth, look up $t_1$ in the sine table. Sixth look up $t_2$ is sine table using 90° offset. Seventh, compute theta. The sine table can be stored in the memory unit of the locator unit 10, and the algorithm can be executed by the control unit 60 of the locator unit 10.

The examples given above are provided to illustrate the application of the invention and are not intended to limit the scope of the invention. Various embodiments of the present invention can include different combinations of the described features. The scope of the invention is intended to be defined by the following claims.

What is claimed is:

1. A system comprising:
   a first locator module comprising:
   a first memory unit operable to store one or more first address codes;
   a first transmitter operable to wirelessly transmit a locator signal, wherein the locator signal includes a first address code;

a first receiver operable to receive a return signal transmitted by a transceiver module;

one or more antennas operably connectable to the first transmitter and the first receiver; and a first control unit operable to determine a relative direction of the transceiver module from the first locator module; and the transceiver module comprising:

a second memory unit operable to store a second address code;

a second receiver operable to receive the locator signal transmitted from the first locator module;

a second transmitter operable to wirelessly transmit the return signal;

a second control unit operable to compare the first address code transmitted by the first locator module with the second address code, and activate the second transmitter to transmit the return signal if the two codes are the same; and a timer operable to activate the second receiver and second control unit.

2. The system of claim 1, further comprising a second locator module in communication with the first locator module, wherein the first locator module is operable to command the second locator module to search for the transceiver module.

3. The system of claim 2, wherein the first locator module commands the second locator module to search for the transceiver module when the first locator module has been unable to determine the relative direction of the transceiver module from the first locator module.

4. The system of claim 2, wherein the first locator module and second locator module are in communication with each other via a wireless communication path.

5. The system of claim 2, wherein the first locator module and second locator module are in communication with each other via a computer network.

6. The system of claim 1, wherein the first locator module further comprises a third transmitter operable to send a first signal to a second locator module and further comprising a third receiver operable to receive a second signal from the second locator module.

7. A system comprising:

two or more locator modules, each of the locator modules comprising:

a first memory unit operable to store one or more first address codes;

a first transmitter operable to wirelessly transmit a locator signal, wherein the locator signal includes a first address code;

a first receiver operable to receive a return signal transmitted by a transceiver module;

one or more antennas operably connectable to the first transmitter and the first receiver; and a first control unit operable to determine a relative direction of the transceiver module from the first locator module; and the transceiver module comprising:

a second memory unit operable to store a second address code;

a second receiver operable to receive the locator signal transmitted from the first locator module;

a second transmitter operable to wirelessly transmit the return signal;

a second control unit operable to compare the first address code transmitted by the first locator module with the second address code, and activate the second transmitter to transmit the return signal if the two codes are the same; and a timer operable to activate the second receiver and second control unit;

wherein if one of the two or more locator modules is not successful in locating the transceiver module, the locator module is operable to command at least one other of the two or more locator modules to attempt to locate the transceiver module.

8. The system of claim 7, wherein each of the two or more locator modules comprises a second transceiver module.

9. The system of claim 8, wherein a first of the two or more locator modules is operable to determine the relative direction of a second of the two or more locator modules by determining the relative direction of the second transceiver of the second of the two or more locator modules.

10. The system of claim 7, wherein the two or more locator modules are in communication with each other via a wireless communication path.

11. The system of claim 7, wherein the two or more locator modules are in communication with each other via a computer network.

12. A system comprising:

a portable locator module comprising:

a first radio frequency transmitter operable to transmit a first address code;

a first receiver configured to receive a return signal transmitted by a second transmitter;

an antenna array operably connectable to the first transmitter and the first receiver by a switch; and a first control unit operable to control the switch, the first control unit operable to determine the bearing of a transceiver module from the control unit; and the transceiver module comprising:

a second receiver operable to receive the signal transmitted by the first transmitter;

the second transmitter operable to wirelessly transmit the return signal;

a second control unit operable to compare the first address code transmitted by the locator module with an address code stored in the transceiver module and activate the second transmitter to wirelessly transmit the return signal if the two codes match.

\* \* \* \* \*